(12) United States Patent
Jung

(10) Patent No.: US 12,348,056 B2
(45) Date of Patent: Jul. 1, 2025

(54) APPARATUS OF NON-CONTACT POWER RECEIVER UTILIZING TRANSMISSION OF A POWER ADJUSTMENT REQUEST TO A NON-CONTACT POWER TRANSMITTER

(71) Applicant: INTEL CORPORATION, Santa Clara, CA (US)

(72) Inventor: Chun-Kil Jung, Seoul (KR)

(73) Assignee: INTEL CORPORATION, Santa Clara, CA (US)

( * ) Notice: Subject to any disclaimer, the term of this patent is extended or adjusted under 35 U.S.C. 154(b) by 711 days.

(21) Appl. No.: 17/401,108

(22) Filed: Aug. 12, 2021

(65) Prior Publication Data

US 2021/0376663 A1    Dec. 2, 2021

Related U.S. Application Data

(63) Continuation of application No. 13/970,340, filed on Aug. 19, 2013, now Pat. No. 11,387,677, which is a
(Continued)

(30) Foreign Application Priority Data

Feb. 20, 2008  (KR) ........................ 10-2008-0015114

(51) Int. Cl.
*H02J 50/80*      (2016.01)
*H02J 50/10*      (2016.01)
(Continued)

(52) U.S. Cl.
CPC .............. *H02J 50/80* (2016.02); *H02J 50/10* (2016.02); *H02J 50/12* (2016.02); *H02J 50/60* (2016.02); *H02J 50/70* (2016.02)

(58) Field of Classification Search
CPC ............ H02J 50/12; H02J 50/10; H02J 50/60; H02J 50/70; H02J 50/80
(Continued)

(56) References Cited

U.S. PATENT DOCUMENTS 4,654,573 A    3/1987    Rough et al.
5,455,467 A   10/1995    Young et al.
(Continued)

FOREIGN PATENT DOCUMENTS

CN    101147308    3/2008
EP     1542332     6/2005
(Continued)

OTHER PUBLICATIONS

Notice of Allowance for U.S. Appl. No. 13/970,340, mailed on Mar. 1, 2022, 9 pages.
(Continued)

*Primary Examiner* — Richard Isla
*Assistant Examiner* — Manuel Hernandez
(74) *Attorney, Agent, or Firm* — Shichrur & Co.

(57) ABSTRACT

A non-contact power charging, in which power transmission can be interrupted when foreign materials are deposited on a charge plate of the non-contact power charging system. A charging operation can be continuously maintained at a stable voltage even if a non-contact power receiving apparatus moves by touching or displacement on the charge plate of the non-contact power charging system in the charging operation. Charging efficiency is improved.

21 Claims, 18 Drawing Sheets

Related U.S. Application Data continuation of application No. 13/226,769, filed on Sep. 7, 2011, now Pat. No. 9,142,995, which is a continuation of application No. 12/166,527, filed on Jul. 2, 2008, now Pat. No. 8,030,887.

(51) Int. Cl.
*H02J 50/12* (2016.01)
*H02J 50/60* (2016.01)
*H02J 50/70* (2016.01)

(58) Field of Classification Search
USPC .......................................... 320/108; 307/104
See application file for complete search history.

(56) References Cited

U.S. PATENT DOCUMENTS

| | | | |
|---|---|---|---|
| 5,844,918 | A | 12/1998 | Kato |
| 6,118,249 | A | 9/2000 | Brockmann et al. |
| 6,184,651 | B1 | 2/2001 | Fernandez et al. |
| 6,304,970 | B1 | 10/2001 | Bizzaro et al. |
| 6,844,702 | B2 | 1/2005 | Giannopoulos et al. |
| 6,917,182 | B2 | 7/2005 | Burton et al. |
| 6,969,927 | B1 | 11/2005 | Lee |
| 7,078,666 | B2 | 7/2006 | Tuominen et al. |
| 7,230,933 | B2 | 6/2007 | Bahl et al. |
| 7,375,493 | B2 | 5/2008 | Calhoon et al. |
| 7,443,135 | B2 | 10/2008 | Cho |
| 7,605,496 | B2 | 10/2009 | Stevens et al. |
| 8,004,118 | B2 | 8/2011 | Kamijo et al. |
| 8,030,887 | B2 | 10/2011 | Jung |
| 8,169,185 | B2 | 5/2012 | Partovi et al. |
| 8,198,754 | B2 | 6/2012 | Iisaka et al. |
| 8,427,011 | B2 | 4/2013 | Jung et al. |
| 8,552,593 | B2 | 10/2013 | Jung et al. |
| 9,142,995 | B2 | 9/2015 | Jung |
| RE46,046 | E | 6/2016 | Jung |
| 11,641,113 | B2 | 5/2023 | Jung et al. |
| 2003/0198196 | A1 | 10/2003 | Bahl et al. |
| 2004/0130915 | A1 | 7/2004 | Baarman |
| 2004/0266367 | A1 | 12/2004 | Tuominen et al. |
| 2005/0068019 | A1* | 3/2005 | Nakamura ............ H02J 50/80 323/355 |
| 2006/0113955 | A1 | 6/2006 | Nunally |
| 2007/0042729 | A1 | 2/2007 | Baaman et al. |
| 2007/0090790 | A1 | 4/2007 | Hui |
| 2007/0139000 | A1 | 6/2007 | Kozuma et al. |
| 2007/0182367 | A1 | 8/2007 | Partovi |
| 2007/0216392 | A1 | 9/2007 | Stevens et al. |
| 2007/0228833 | A1 | 10/2007 | Stevens et al. |
| 2007/0247883 | A1 | 10/2007 | Belyanin |
| 2008/0079392 | A1 | 4/2008 | Baarman et al. |
| 2008/0094027 | A1 | 4/2008 | Cho |
| 2008/0164839 | A1 | 7/2008 | Kato et al. |
| 2008/0169706 | A1 | 7/2008 | Onishi et al. |
| 2008/0174267 | A1 | 7/2008 | Onishi et al. |
| 2008/0197802 | A1 | 8/2008 | Onishi et al. |
| 2008/0200119 | A1 | 8/2008 | Onishi et al. |
| 2008/0303479 | A1 | 12/2008 | Park et al. |
| 2009/0001932 | A1 | 1/2009 | Kamijo et al. |
| 2009/0015209 | A1 | 1/2009 | Morina et al. |
| 2009/0021219 | A1 | 1/2009 | Yoda et al. |
| 2009/0140691 | A1 | 6/2009 | Jung |
| 2009/0174263 | A1 | 7/2009 | Baarman et al. |
| 2009/0261778 | A1 | 10/2009 | Kook |
| 2010/0156343 | A1 | 6/2010 | Jung |
| 2011/0140538 | A1 | 6/2011 | Jung et al. |
| 2011/0260550 | A1 | 10/2011 | Jung et al. |
| 2013/0169060 | A1 | 7/2013 | Jung et al. |
| 2013/0335016 | A1 | 12/2013 | Jung |
| 2014/0021797 | A1 | 1/2014 | Jung et al. |
| 2020/0177012 | A1* | 6/2020 | Li ..................... G05F 3/262 |
| 2022/0352763 | A1* | 11/2022 | Melone ................ H02J 50/80 |
| 2023/0307917 | A1 | 9/2023 | Jung et al. |

FOREIGN PATENT DOCUMENTS

| | | | |
|---|---|---|---|
| EP | 1 962 403 | | 8/2008 |
| GB | 2 389 720 | | 12/2003 |
| GB | 2472704 A * | | 2/2011 ............ G08C 17/02 |
| JP | 62-260526 | | 11/1987 |
| JP | 7-39077 | | 2/1995 |
| JP | 9-103037 | | 4/1997 |
| JP | 2001136667 | | 5/2001 |
| JP | 2001-275266 | | 10/2001 |
| JP | 2001275280 | | 10/2001 |
| JP | 2001309579 | | 11/2001 |
| JP | 2002315209 | | 10/2002 |
| JP | 2005-110409 | | 4/2005 |
| JP | 2005110409 A * | | 4/2005 ............... G06F 1/26 |
| JP | 2006-60909 | | 3/2006 |
| JP | 2006141170 | | 6/2006 |
| JP | 2006230032 | | 8/2006 |
| JP | 2008141816 | | 6/2008 |
| JP | 2008206327 | | 9/2008 |
| KR | 200361755 | | 9/2004 |
| KR | 10-2004-0087037 | | 10/2004 |
| KR | 100554889 | | 2/2006 |
| KR | 10-2007-0014949 | | 2/2007 |
| KR | 1020070104777 | | 10/2007 |
| KR | 10-2008-0005020 | | 1/2008 |
| KR | 20080012782 | | 2/2008 |
| KR | 100821885 | | 4/2008 |
| KR | 20080032519 | | 4/2008 |
| TW | 533646 | | 5/2003 |
| WO | WO-0128629 A1 * | | 4/2001 ........... A61N 1/3787 |
| WO | 02/15320 | | 2/2002 |
| WO | 2007/013726 | | 1/2007 |
| WO | 2007/015599 | | 2/2007 |
| WO | 2007/089086 | | 8/2007 |
| WO | 2008050917 | | 5/2008 |
| WO | 2008137996 | | 11/2008 |
| WO | 2010068062 | | 6/2010 |

OTHER PUBLICATIONS

Office Action for U.S. Appl. No. 13/755,710, mailed Sep. 13, 2013, 109 pages.
Office Action for U.S. Appl. No. 13/755,710, mailed May 8, 2014, 29 pages.
European Search Report for EP Patent Application No. 08159825.2, mailed Mar. 13, 2014, 7 pages.
Office Action for U.S. Appl. No. 13/755,710, mailed Apr. 28, 2015, 57 pages.
Office Action for U.S. Appl. No. 13/970,340, mailed Feb. 10, 2016, 15 pages.
Office Action for U.S. Appl. No. 13/970,340, mailed Oct. 4, 2016, 11 pages.
Office Action for U.S. Appl. No. 13/970,340, mailed Apr. 21, 2017, 8 pages.
Office Action for U.S. Appl. No. 13/970,340, mailed Jan. 31, 2018, 8 pages.
Office Action for U.S. Appl. No. 13/970,340, mailed Aug. 3, 2018, 9 pages.
Office Action for U.S. Appl. No. 13/970,340, mailed Mar. 22, 2019, 8 pages.
Office Action for U.S. Appl. No. 13/970,340, mailed Aug. 14, 2019, 9 pages.
Office Action for U.S. Appl. No. 13/970,340, mailed Jan. 23, 2020, 10 pages.
Examiner's Answer Before the Patent Trial and Appeal Board for U.S. Appl. No. 13/970,340, mailed Jul. 24, 2020, 12 pages.
PCT Written Opinion of the International Searching Authority, PCT Application No. PCT/KR2009/007430, dale of mailing Jul. 30, 2010, 4 pages.
Supplementary European Search Report, EP Application No. 09825620, date of completion Aug. 29, 2014, 2 pages.
Office Action for U.S. Appl. No. 15/358,436, mailed on Feb. 15, 2019, 22 pages.

(56) References Cited

OTHER PUBLICATIONS

Office Action for U.S. Appl. No. 15/358,436, mailed on Jun. 28, 2019, 13 pages.
Office Action for U.S. Appl. No. 15/358,436, mailed on Nov. 12, 2019, 9 pages.
Office Action for U.S. Appl. No. 15/358,436, mailed on Jul. 10, 2020, 10 pages.
Notice of Allowance for U.S. Appl. No. 15/358,436, mailed on Sep. 2, 2020, 5 pages.
Notice of Allowance for U.S. Appl. No. 17/120,487, mailed on Dec. 28, 2022, 20 pages.
Patent Board Decision for U.S. Appl. No. 13/970,340, mailed on Nov. 18, 2021, 7 pages.
Office Action for U.S. Appl. No. 18/191,329, mailed on Sep. 27, 2024, 44 pages.

\* cited by examiner

APPARATUS OF NON-CONTACT POWER RECEIVER UTILIZING TRANSMISSION OF A POWER ADJUSTMENT REQUEST TO A NON-CONTACT POWER TRANSMITTER

CROSS-REFERENCE TO RELATED APPLICATIONS

This application is a continuation of U.S. application Ser. No. 13/226,769, filed Sep. 7, 2011 in the U.S. Patent and Trademark Office, which is a continuation of U.S. application Ser. No. 12/166,527, filed Jul. 2, 2008 in the U.S. Patent and Trademark Office, now patented as U.S. Pat. No. 8,030,887, issued Oct. 4, 2011, which claims the benefit of Korean Application No. 10-2008-0015114, filed Feb. 20, 2008, in the Korean Intellectual Property Office. All disclosures of the document(s) named above are incorporated herein by reference.

BACKGROUND OF THE INVENTION

1. Field of the Invention

The present invention relates to a power charging system, and more particularly, to a non-contact power charging system and a control method thereof, in which power transmission can be interrupted when foreign materials are deposited on a charge plate of the non-contact power charging system, a charging operation can be continuously maintained at a stable voltage even if a non-contact power receiving apparatus moves by touching or displacement on the charge plate of the non-contact power charging system in the charging operation, and thus charging efficiency can be improved.

2. Description of the Related Art

Portable electronic devices, such as cellular phones, personal digital assistants (PDAs), portable media players (PMPs), digital multimedia broadcasting terminal (DMB terminals), MPEG audio layer 3 (MP3) players or notebook computers, cannot be plugged into a regular power source at home or office since they are generally used while the users are moving. Accordingly, the portable electronic devices are equipped with batteries or rechargeable batteries.

A charging system has been used to charge electric power, supplied from the regular power source, to the batteries or a battery pack of the portable devices via power supply lines or power supply connectors. However, when the charger and the batteries are connected or disconnected to replenish the electric power of the batteries with this connector supply system, an instant discharge may happen because of the potential differences between the charger connector and the battery connector. Hence the foreign substances will be gradually gathered on both connectors and finally there may be a fire disaster. Further, the collected humidity thereon will cause the discharge of the battery and other problems will be involved like the declining battery life, the low battery quality, and so on.

To solve the above-mentioned problems of the connector supply system, non-contacting charging systems have been developed. In this non-contacting charging system in accordance with the prior art, the device having the battery to be charged is placed over the primary coil of the non-contacting charging system and the battery will be charged by a secondary coil of the battery. The battery is charged with the induced electricity from the induced electromotive force of the secondary coil by the generated magnetic field from the primary coil.

The existing non-contacting charging systems with the prior art can only be used to supply the electricity to the portable devices. There are limited practical uses because they cannot be used in various alternatives.

Besides, if a metal is placed inside the effective radius of the generated magnetic field of the primary coil, there would be a lot loss of the electricity in the primary coil due to the changes of the magnetic field, so that non-contacting charging system may be damaged.

SUMMARY OF THE INVENTION

The present invention has been made to solve the foregoing problems with the prior art, and therefore the present invention is directed to prevent a non-contact power receiving apparatus and a non-contact power transmission apparatus by stopping power transmission when a foreign material is deposited on a charge plate.

The present invention is also directed to improve charging efficiency by ensuring that a charging operation be performed at a stable voltage even if the non-contact power receiving apparatus moves by touching or displacement on the charge plate of the non-contact power transmission apparatus while being powered.

Further, the present invention is also directed to protect a battery cell from a magnetic field created by primary and secondary charge cores such that the battery cell can be stably charged.

According to an aspect of the present invention, there is provided a non-contact power charging system, including a non-contact power transmission apparatus generating a power signal at a primary charge core thereof; and a non-contact power receiving apparatus receiving the power signal from the non-contact power transmission apparatus so as to be charged with power by the control of the non-contact power charging system. The non-contact power receiving apparatus includes a secondary charge core generating induced current in response to the primary charge core of the non-contact power transmission apparatus; a rectifier block connected to the secondary charge core to rectify the induced current; a charge IC block causing to charge a battery cell with the power from the rectifier block; a received power monitor module monitoring the power received through the secondary charge core; and a power receiver control unit constructed to control the rectifier block, the charge integrated circuit (IC) block and the received power monitor module, and to control identifier (ID) generation and a charge status signal. The received power monitor module includes a low voltage monitor module comparing and discerning whether or not the received power is detected to have a low voltage and a high voltage monitor module comparing and discerning whether or not the received power is detected to have a high voltage.

According to another aspect of the present invention, there is provided a control method of a non-contact power charging system, which includes a non-contact power transmission apparatus generating a power signal at a primary charge core thereof and a non-contact power receiving apparatus receiving the power signal from the non-contact power transmission apparatus so as to be charged with power. The control method includes procedures:

transmitting, at the primary core of the non-contact power transmission apparatus, an object detection signal including a call signal that call a unique ID value from the non-contact power receiving apparatus, and standing by for a response signal;

discerning whether or not a normal unique ID signal is received from the non-contact power receiving apparatus by discerning a signal detected according to load modulation by the primary charge core;

if it is discerned that a normal unique ID signal is received from the non-contact power receiving apparatus, generating, at the primary charge core through a gate driver module of the non-contact power transmission apparatus, a full power transmission signal;

requesting charge status information from the non-contact power receiving apparatus and adjusting charge level based on the charge status information received from the non-contact power receiving apparatus; and if fully-charged state information is received from the non-contact power receiving apparatus, terminating a charging operation and displaying fully-charged state on a liquid crystal display panel or a charge status indicator light emitting module.

Here, the procedure of discerning whether or not a normal unique ID signal is received from the non-contact power receiving apparatus by discerning a signal detected according to load modulation by the primary charge core, includes: if the signal detected according to load modulation by the primary charge core is not a normal signal that has normal ID data transmitted from the non-contact power receiving apparatus, converting into a foreign material detection mode; and if a detected foreign material is metal or an electronic device, displaying a foreign material error on the liquid crystal display panel or the charge status indicator light emitting module and terminating a charging operation of a corresponding charging block.

Further, the procedure of adjusting charge level based on the charge status information received from the non-contact power receiving apparatus, includes: requesting data information on charge status information from the non-contact power receiving apparatus; receiving the charge status information transmitted from the non-contact power receiving apparatus, the charge status information including charged amount information and voltage data of received power; analyzing and discerning data on the charge status information on the power signal, received from the non-contact power receiving apparatus; and calculating a frequency of the power signal in order to compensate for transmission power based on the voltage data, received from the non-contact power receiving apparatus, and transmitting a power signal at a compensated frequency.

According to a further aspect of the present invention, there is provided a control method of a non-contact power charging system, which includes a non-contact power transmission apparatus generating a power signal from a primary charge core thereof, and a non-contact power receiving apparatus receiving the power signal from the non-contact power transmission apparatus so as to be charged with power. The control method includes procedures of:

detecting, at the non-contact power receiving apparatus in a standby mode for receiving the power signal, detecting a call signal transmitted together with an object detection signal from the primary charge core of the non-contact power transmission apparatus to call a unique ID value from the non-contact power receiving apparatus, and transmitting a signal related with the call ID value of the non-contact power receiving apparatus to the non-contact power transmission apparatus;

converting into a charge standby mode after the unique ID value is transmitted, rectifying the power signal transmitted from the non-contact power transmission apparatus and charging a battery cell with the rectified power signal;

discerning whether or not the power signal transmitted from the non-contact power transmission apparatus has a reference voltage, and transmitting a voltage adjustment signal to request voltage step-up if the discerned power signal is below the reference voltage or to request voltage step-down if the discerned power signal is above the reference voltage;

after the voltage adjustment signal is transmitted, if a received voltage is the reference voltage, generating a signal indicative of normal reception; and discerning whether or not the battery cell is in fully charged status, and if the battery cell is in fully charged status, terminating a charging operation.

As set forth above, the present invention can prevent the non-contact power receiving apparatus and the non-contact power transmission apparatus from being damaged by stopping power transmission when a foreign material is deposited on the charge plate.

Further, the present invention can also improve charging efficiency by ensuring that a charging operation be performed at a stable voltage even if the non-contact power receiving apparatus moves by touching or displacement on the charge plate of the non-contact power transmission apparatus while being powered.

Moreover, the present invention can also protect the battery cell from a magnetic field created by the primary and secondary charge cores such that the battery cell can be stably charged.

Additional aspects and/or advantages of the invention will be set forth in part in the description which follows and, in part, will be obvious from the description, or may be learned by practice of the invention.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Hereinafter, the present invention will be described more fully with reference to the accompanying drawings, in which exemplary embodiments thereof are shown.

Figure 1:
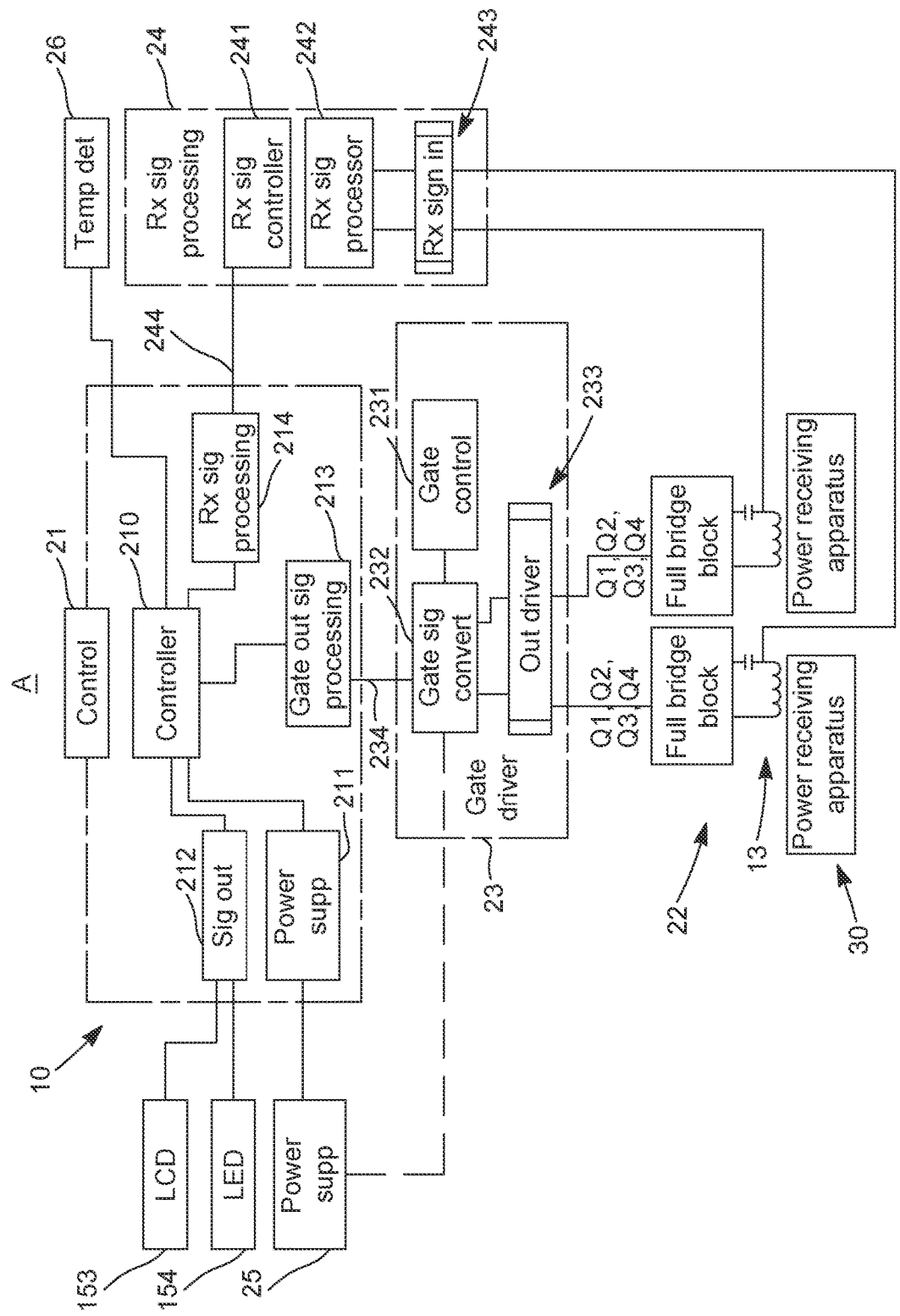
FIG. 1 is a schematic configuration view illustrating a non-contact power transmission apparatus of a non-contact power charging system in accordance with the present invention.
Figure 2:
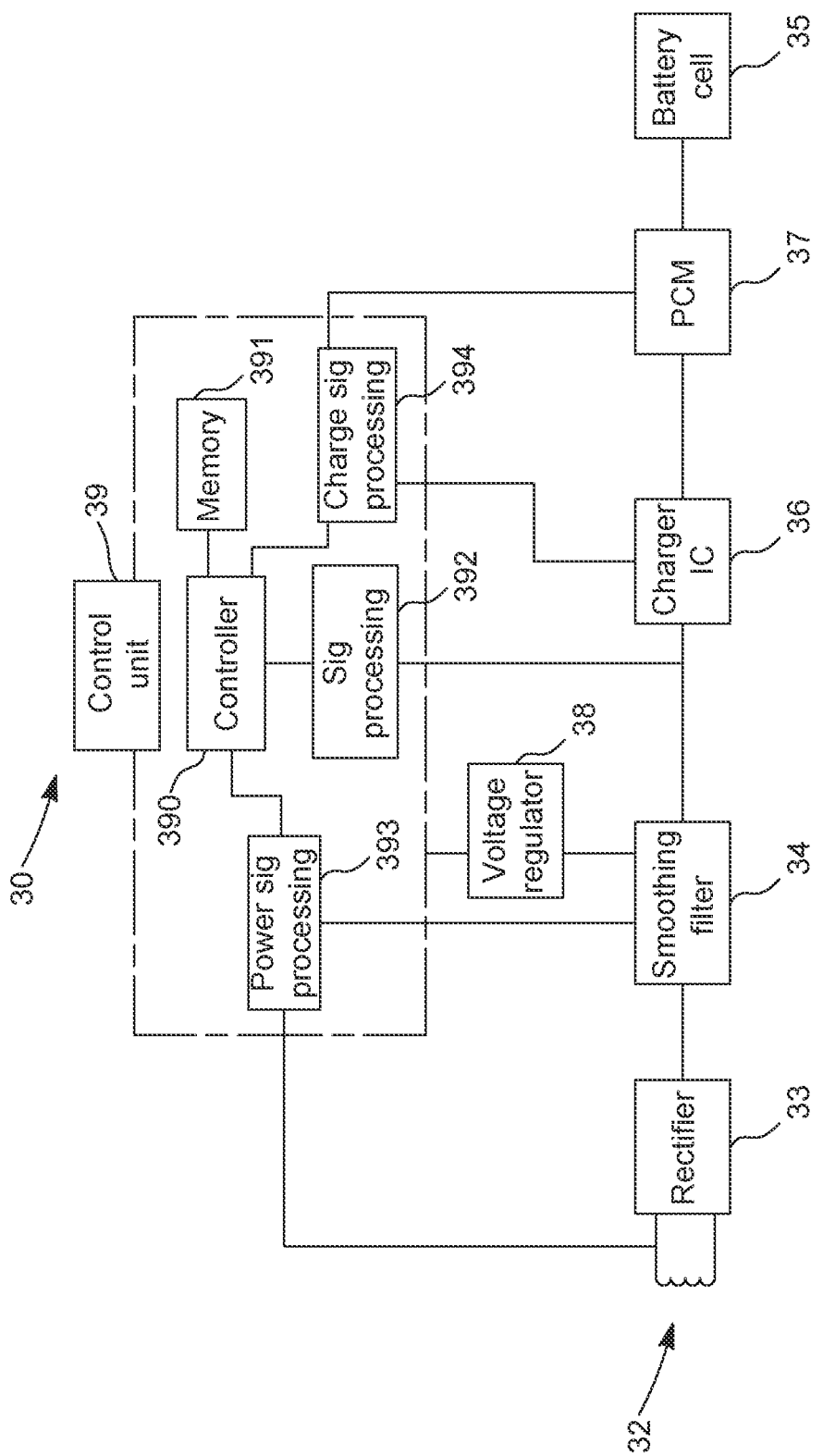
FIG. 2 is a schematic configuration view illustrating a non-contact power receiving apparatus of the non-contact power charging system in accordance with the present invention.
Figure 3:
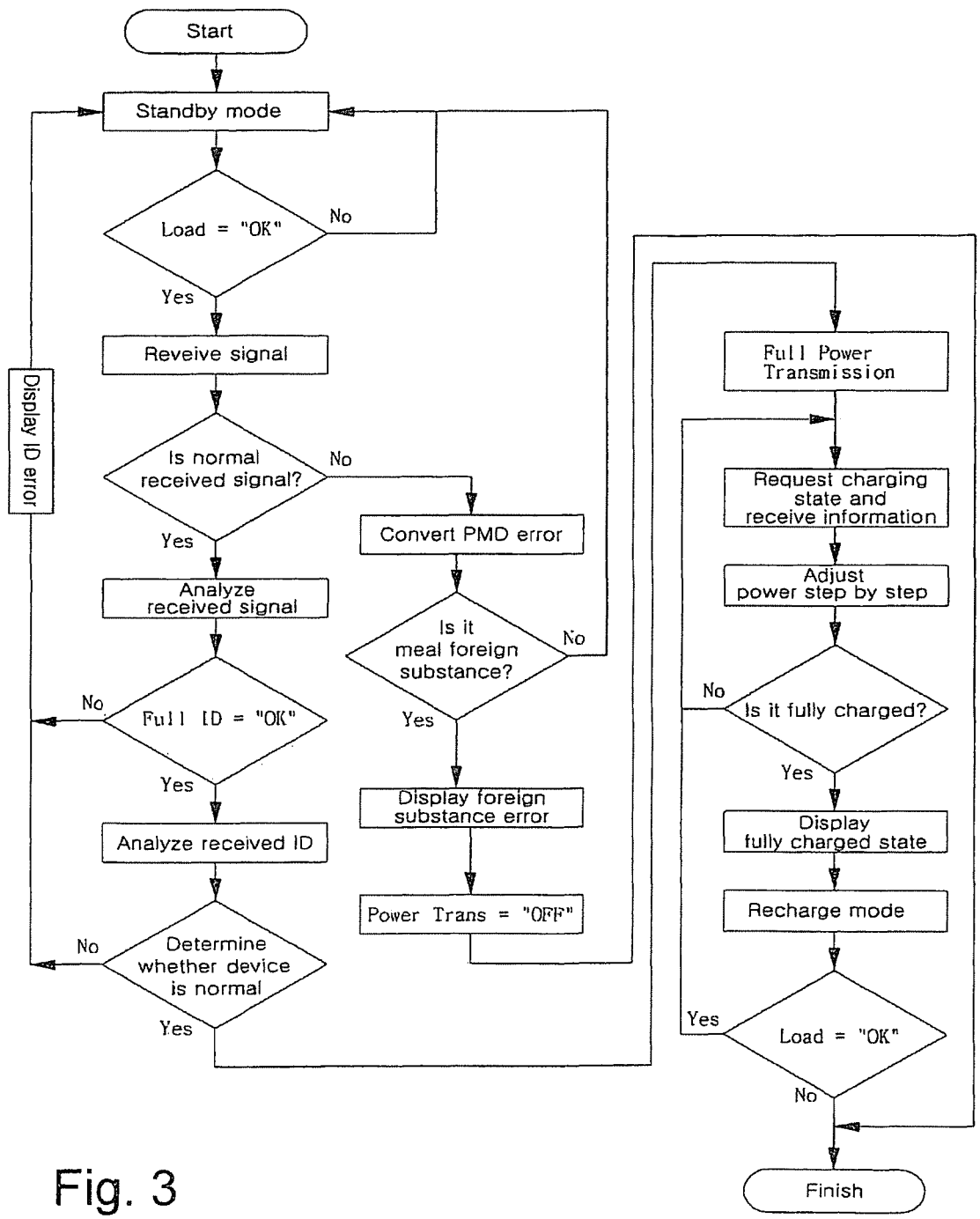
FIG. 3 is a flowchart illustrating a non-contact power transmission process of the non-contact power charging system in accordance with the present invention.
Figure 4:
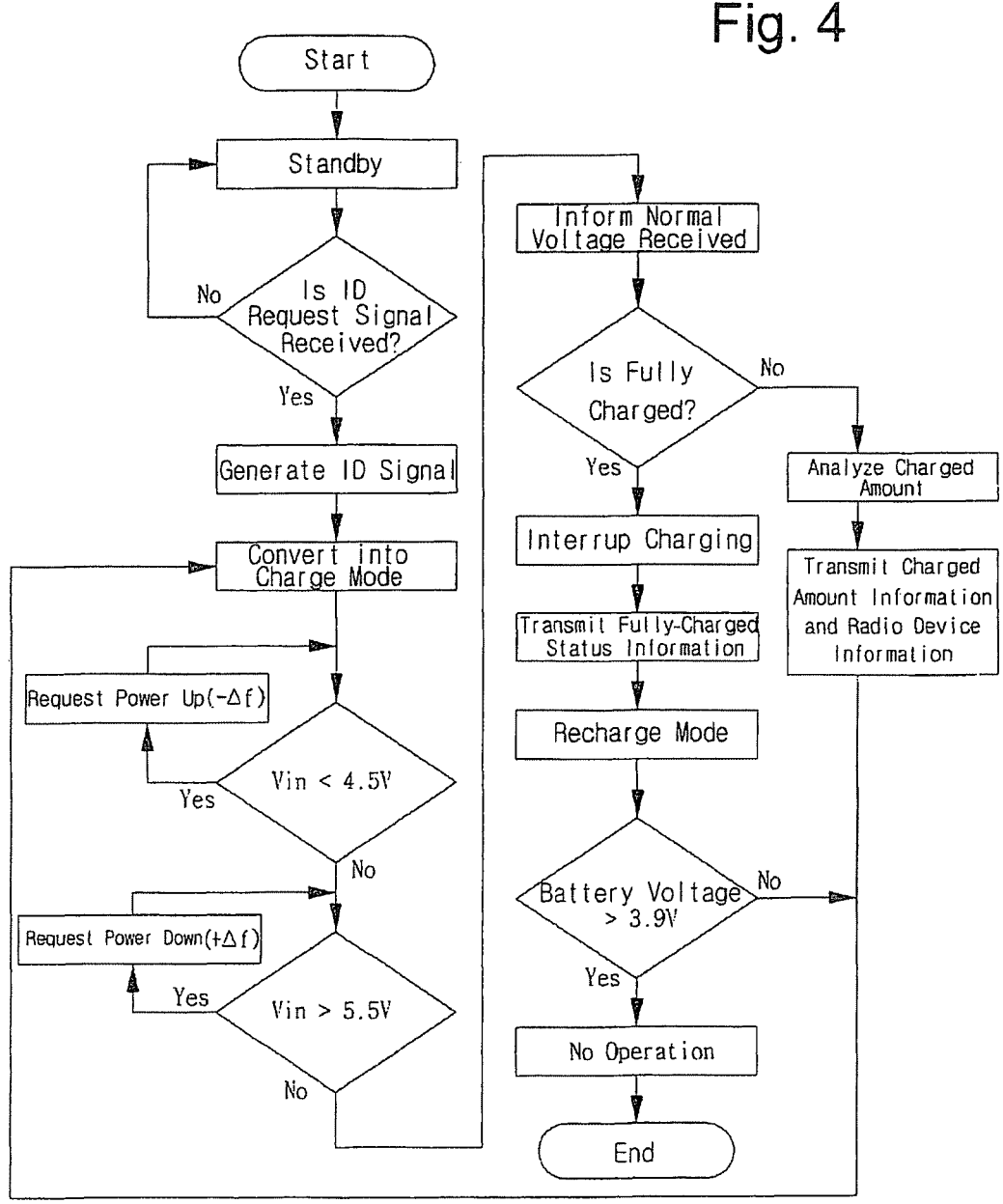
FIG. 4 is a flowchart illustrating a non-contact power receiving process of the non-contact power charging system in accordance with the present invention.
Figure 5:
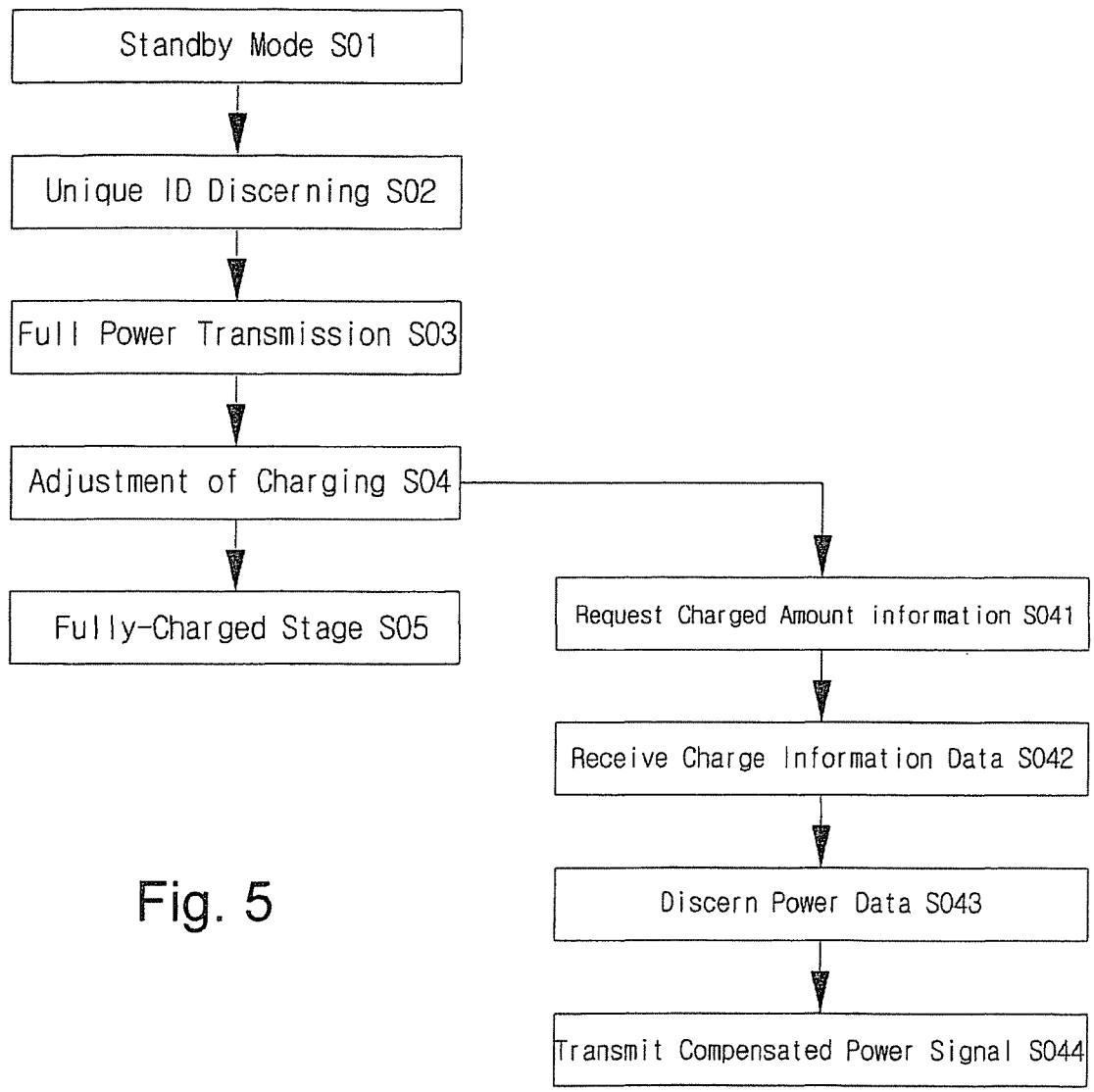
FIG. 5 is a control flow diagram illustrating a non-contact power transmission process of the non-contact power charging system in accordance with the present invention.
Figure 6:
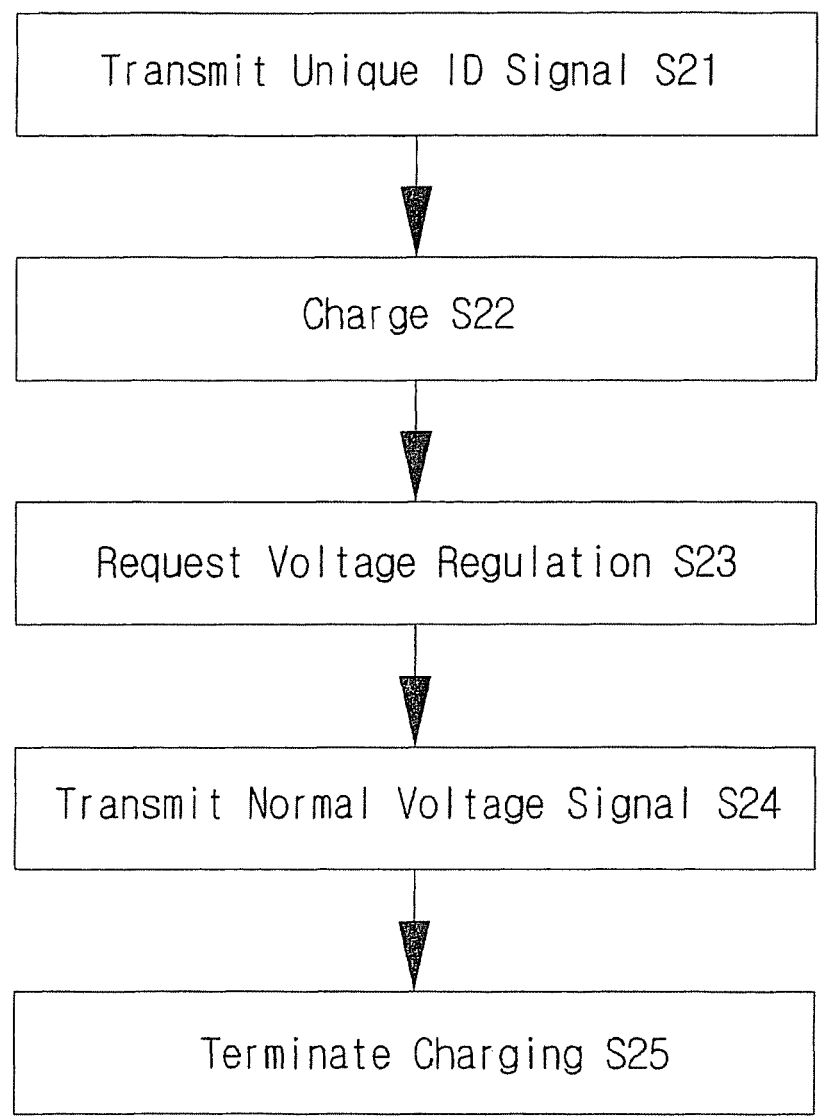
FIG. 6 is a control flow diagram illustrating a non-contact power receiving process of the non-contact power charging system in accordance with the present invention.
Figure 7:
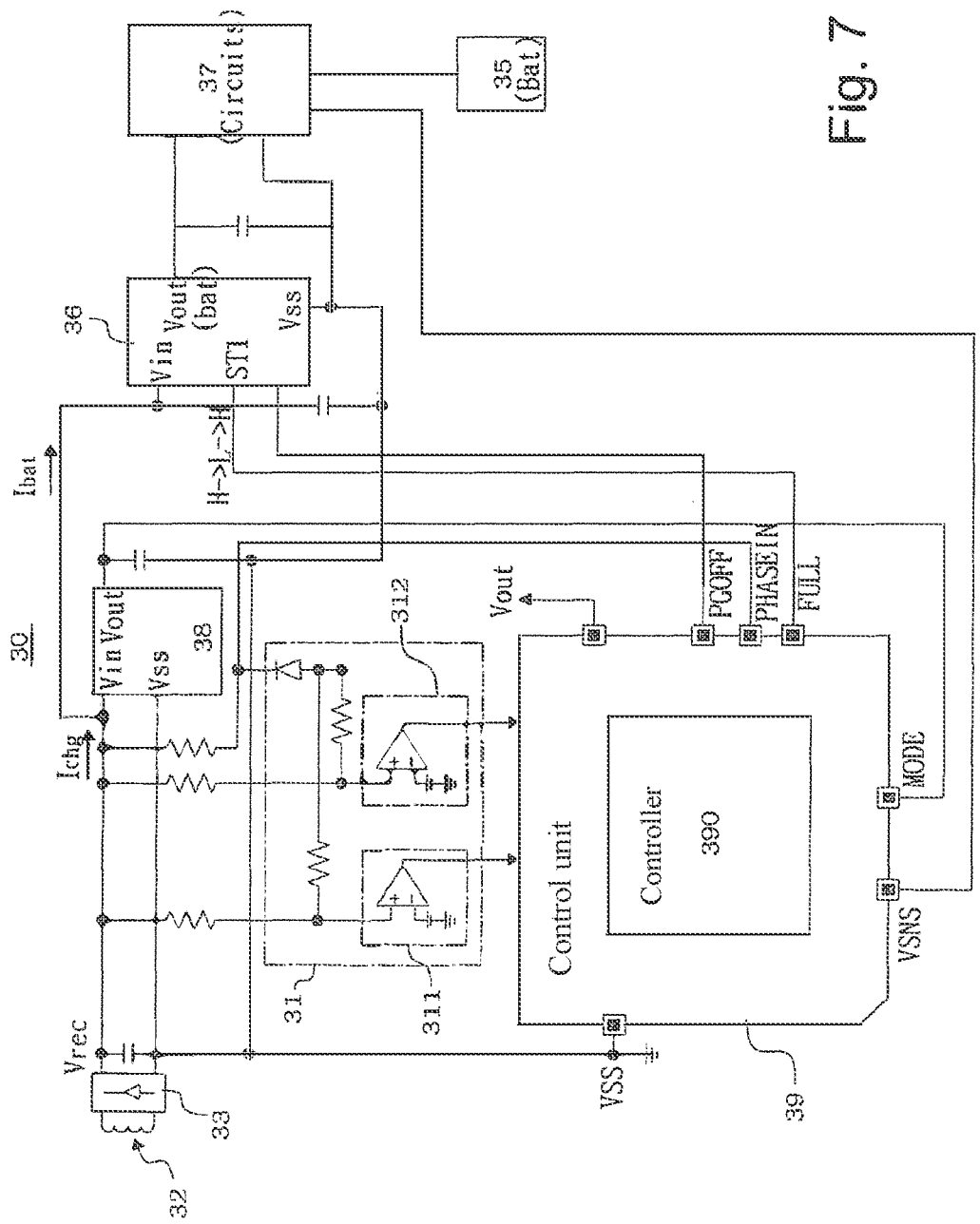
FIGS. 7 and 8 are circuit diagrams illustrating the non-contact power receiving apparatus of the non-contact power charging system in accordance with the present invention.
Figure 8:
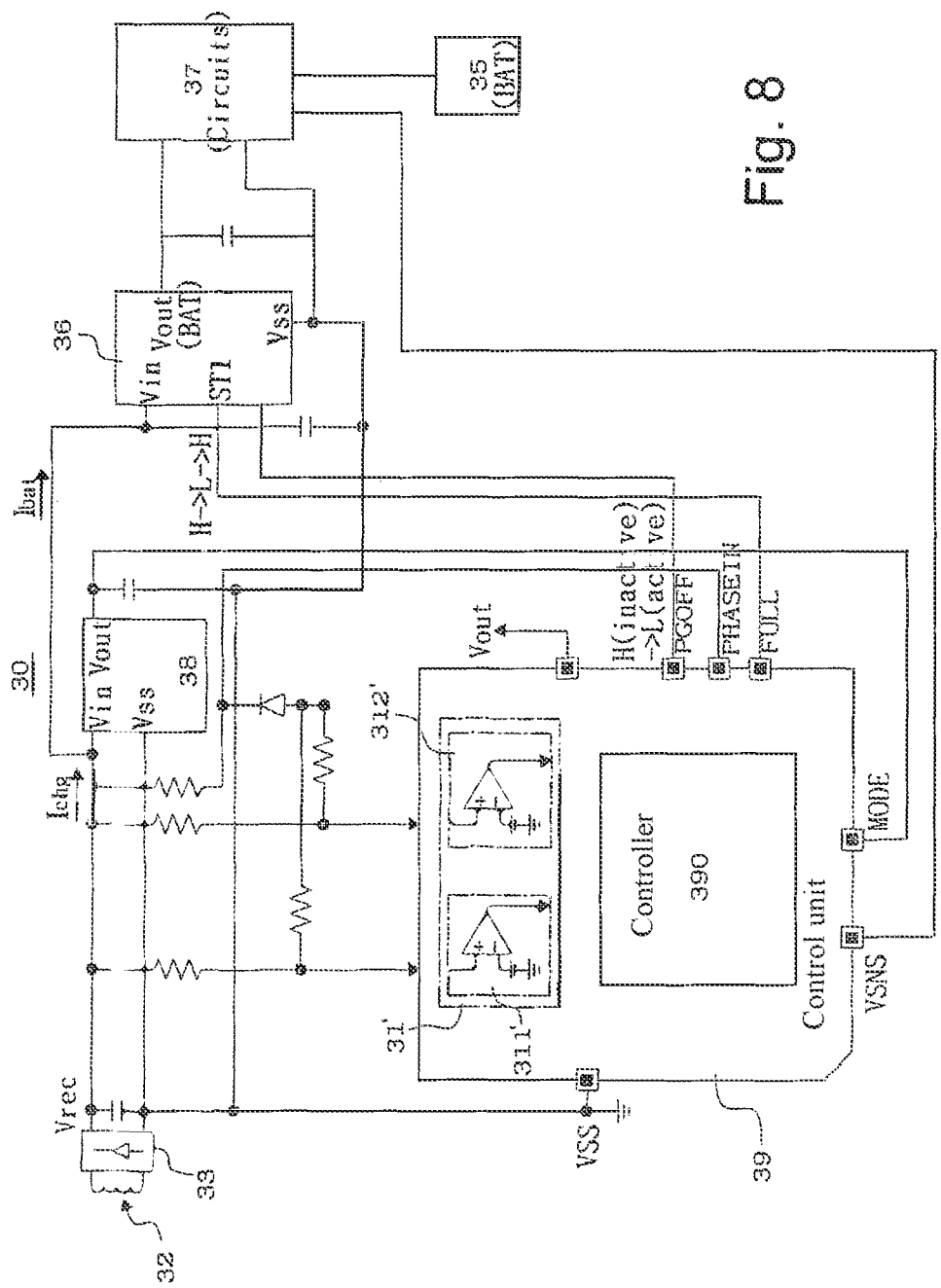
Figure 9:
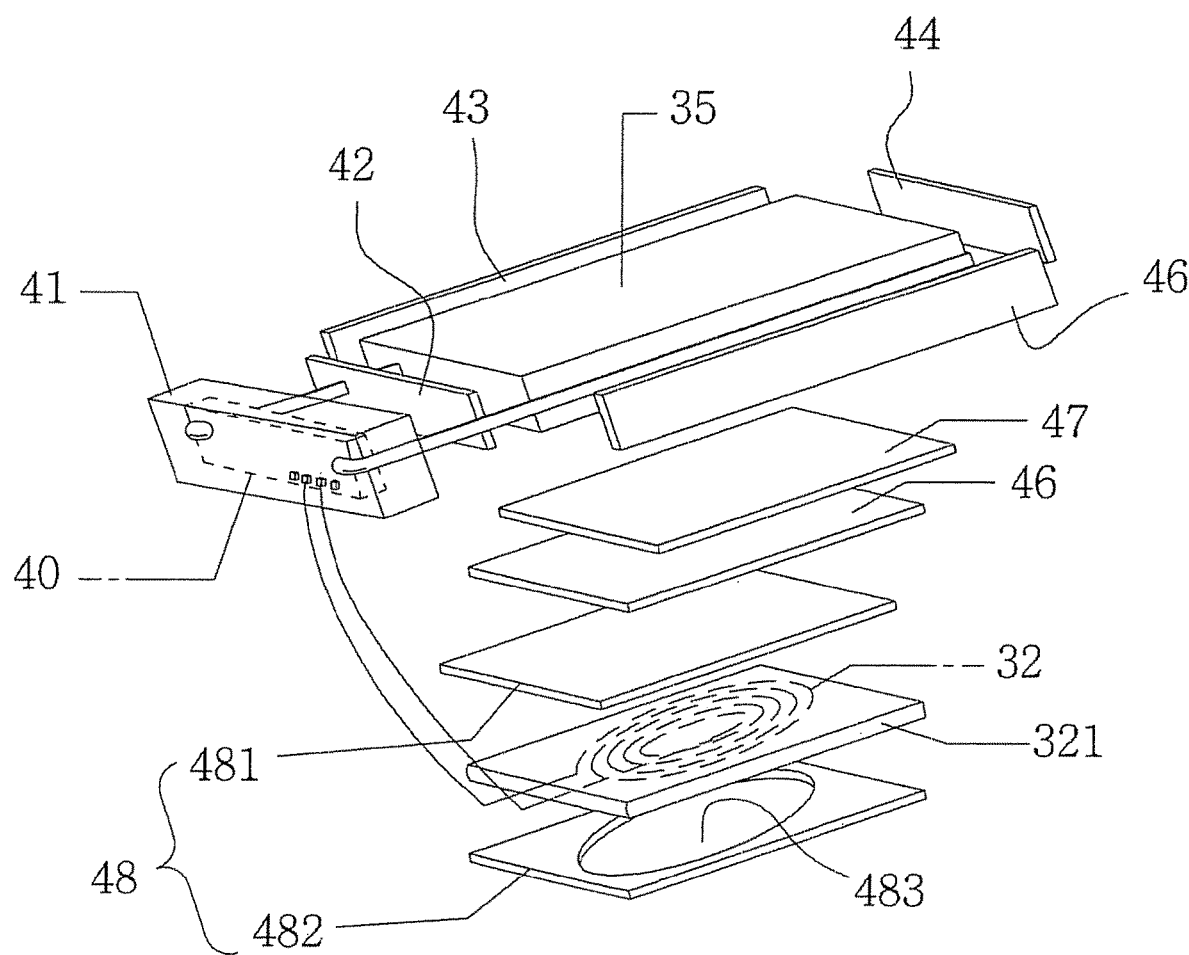
FIG. 9 is an exploded perspective view illustrating the construction of the non-contact power receiving apparatus of the non-contact power charging system in accordance with the present invention.
Figure 10:
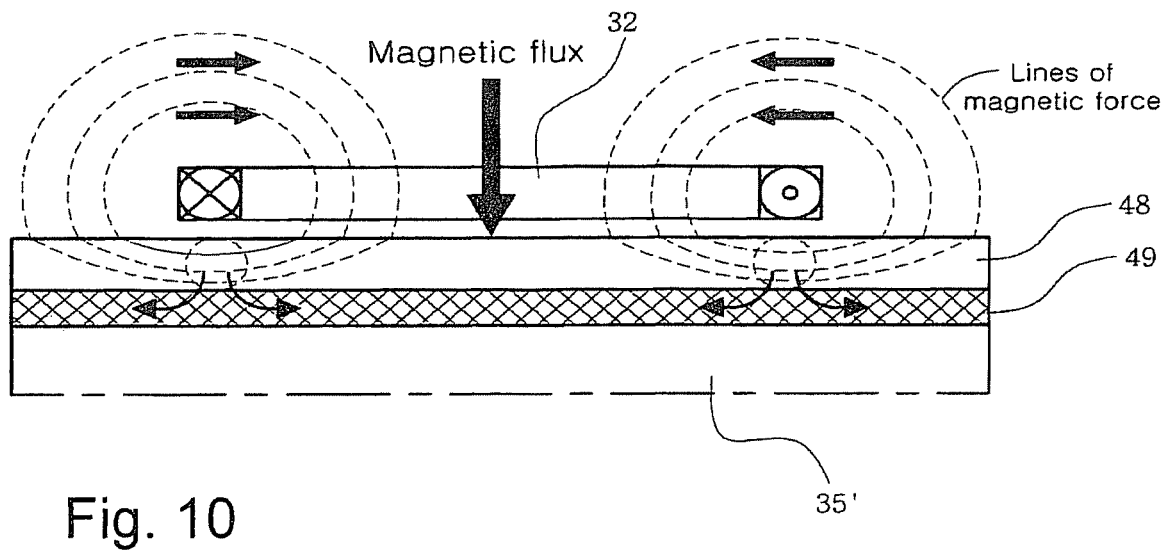
FIG. 10 is a side cross-sectional view of FIG. 9.
Figure 17:
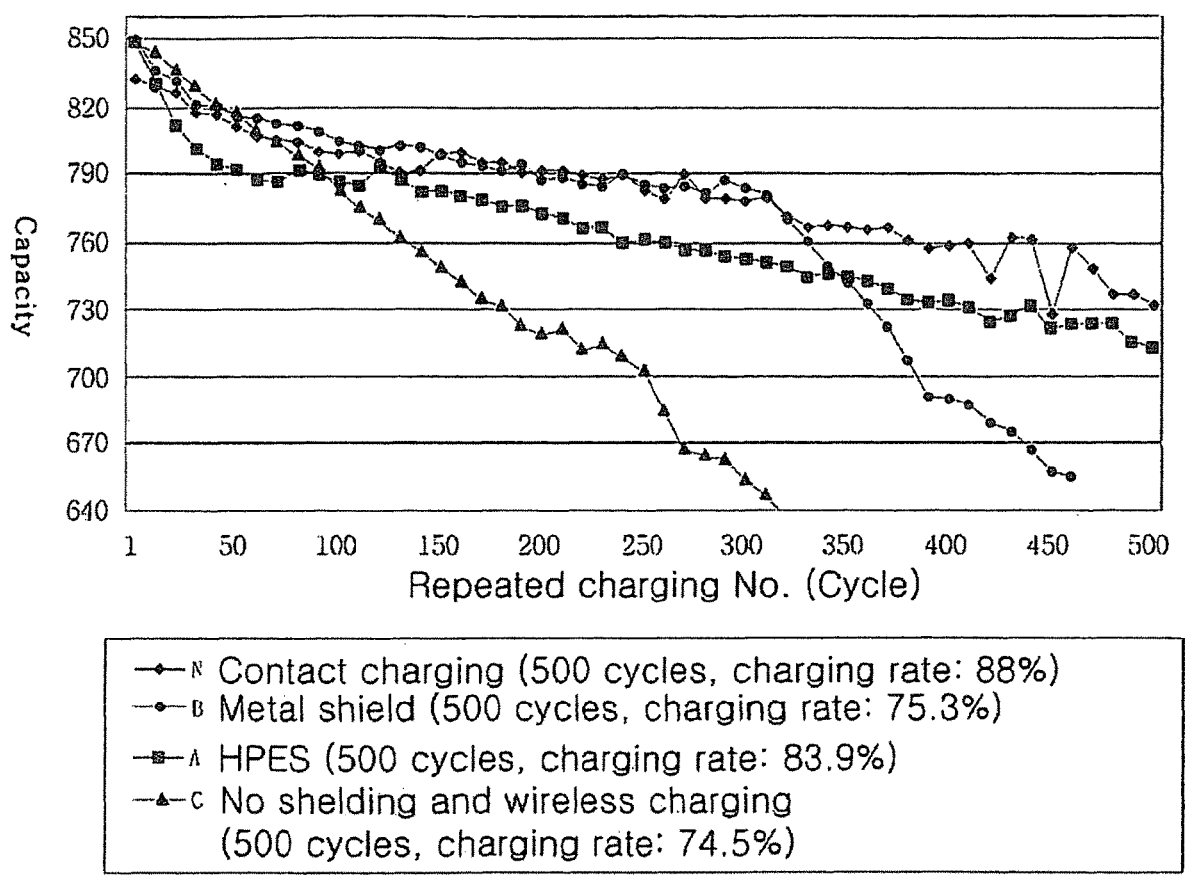
FIG. 17 is a graph illustrating efficiencies of repeated charge/discharge test on the non-contact power receiving apparatus of the non-contact power charging system in accordance with the present invention.
Figure 18:
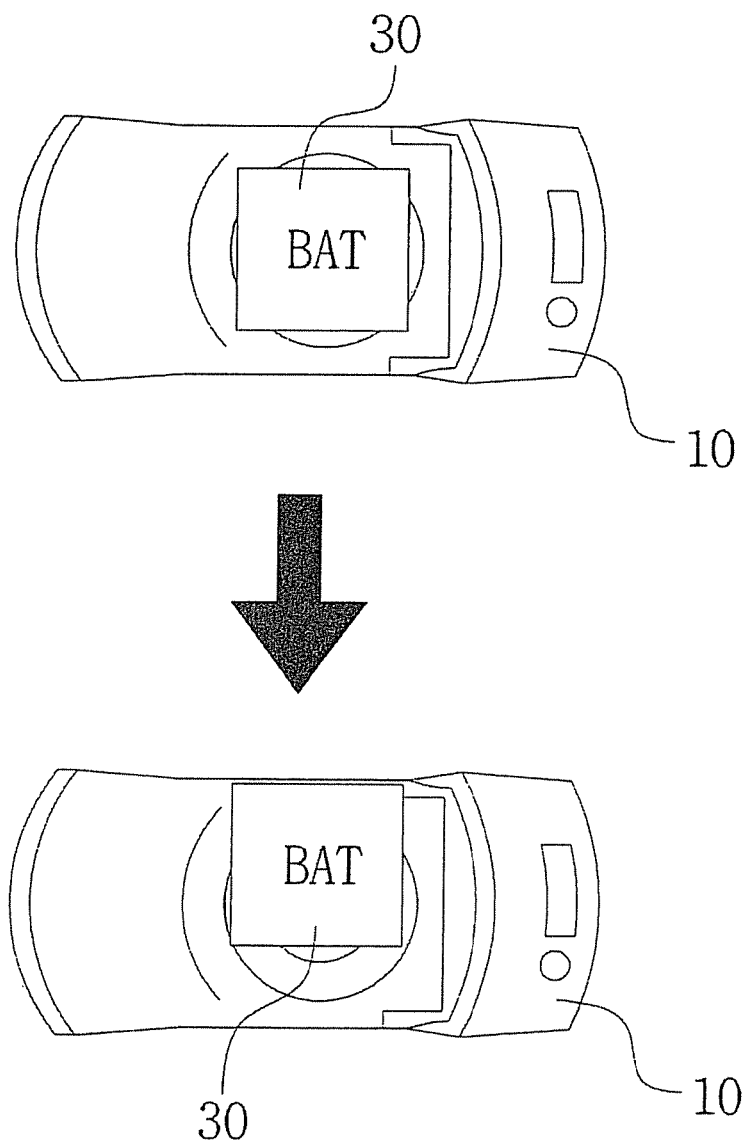
FIGS. 18 and 19 illustrate operations of the non-contact power charging system in accordance with the present invention.
Figure 19:
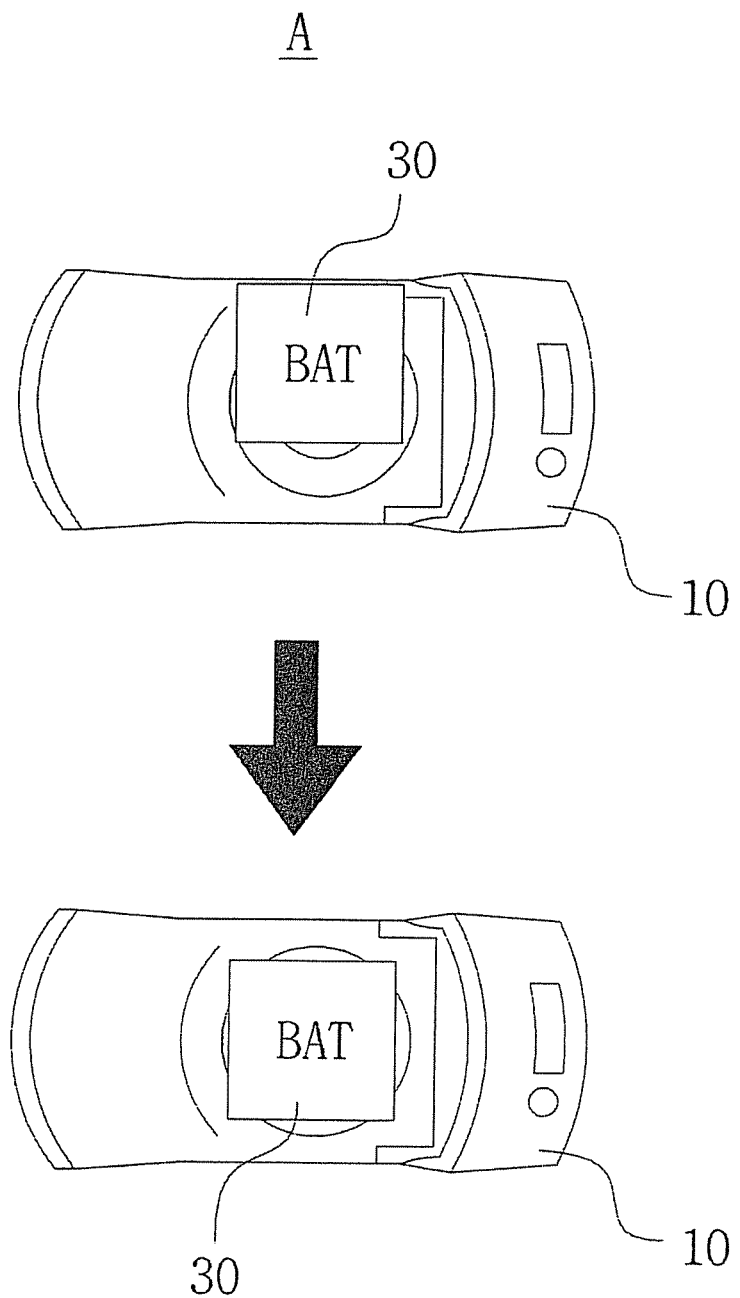

FIG. 1 is a schematic configuration view illustrating a non-contact power transmission apparatus of a non-contact power charging system in accordance with the present invention; FIG. 2 is a schematic configuration view illustrating a non-contact power receiving apparatus of the non-contact power charging system in accordance with the present invention; FIG. 3 is a flowchart illustrating a non-contact power transmission process of the non-contact power charging system in accordance with the present invention; FIG. 4 is a flowchart illustrating a non-contact power receiving process of the non-contact power charging system in accordance with the present invention; FIG. 5 is a control flow diagram illustrating a non-contact power transmission process of the non-contact power charging system in accordance with the present invention; FIG. 6 is a control flow diagram illustrating a non-contact power receiving process of the non-contact power charging system in accordance with the present invention; FIGS. 7 and 8 are circuit diagrams illustrating the non-contact power receiving apparatus of the non-contact power charging system in accordance with the present invention; FIG. 9 is an exploded perspective view illustrating the construction of the non-contact power receiving apparatus of the non-contact power charging system in accordance with the present invention; FIG. 10 is a side cross-sectional view of FIG. 9; FIGS. 11 to 16 are graphs illustrating power control efficiencies of the non-contact power charging system in accordance with the present invention; FIG. 17 is a graph illustrating efficiencies of repeated charge/discharge test on the non-contact power receiving apparatus of the non-contact power charging system in accordance with the present invention; and FIGS. 18 and 19 illustrate operations of the non-contact power charging system in accordance with the present invention.

Referring to FIGS. 1 to 19, a non-contact charging system A of the present invention includes a non-contact power transmission apparatus 10 that is constructed to transmit a power signal to a non-contact power receiving apparatus 30 without actual contacts.

As shown in FIG. 1, the non-contact power transmission apparatus 10 includes a central control unit and a full bridge resonant converter 22, which act to transmit a power signal to the non-contact power receiving apparatus 30 without actual contacts.

The non-contact power transmission apparatus 10 also includes a gate driver module 23, which causes the full bridge resonant converter 22 to transmit a converted power signal, and a received signal processing module 24, which processes a signal transmitted from the non-contact power receiving apparatus and sends the processed signal to the central control unit 21.

The non-contact power transmission apparatus 10 also includes a power transmission apparatus case (not shown). The power transmission apparatus case includes, on the front side thereof, a power on/off switch, an input panel for signal input, a liquid crystal display (LCD) panel 153 and a charge status indicator light emitting diode (LED) module 154. The LCD panel 153 and the LED module 154 serve to display the status and the charge status of a non-contact charge plate (not shown) and the non-contact power receiving apparatus 30. Inside the power transmission apparatus case, a power supply unit 25 is installed.

As such, as shown in FIG. 1, the non-contact power receiving apparatus 30 implemented as a battery of a mobile device, such as a mobile phone, a personal digital assistant (PDA), a portable multimedia player (PMP), a digital multimedia broadcasting terminal (DMB terminal), a moving picture experts group (MPEG) audio layer 3 player (MP3 player) or a notebook computer, is mounted on the charge plate of the non-contact power transmission apparatus. When the non-contact power receiving apparatus is placed on the charge plate, the non-contact power transmission apparatus 10 starts a charging operation by detecting the placement of the non-contact power receiving apparatus 30.

Below a description will be given of the construction of the central control unit 21 controlling the charging operation of the non-contact power transmission apparatus 10. As shown in FIG. 1, the central control unit 21 includes a power supply block 211 connected to the power supply unit 25 to supply power to the non-contact power transmission apparatus 10; a signal output block 212 outputting an indicator signal to the LCD panel 153 and the charge status LED module 154; a gate output signal processing block 213 connected to the gate driver module 23 to transmit a control signal in response to an output power signal from a primary charge core 13; a received signal processing block 214 connected to the primary charge core 13 to process a signal transmitted from the received signal processing module 24, which processes a signal transmitted from the non-contact power receiving apparatus 30; and a main controller 210 controlling parts of the non-contact power transmission apparatus 10 including the power supply block 211, the signal output block 212, the gate output signal processing block 213, the received signal processing block 214 and so on.

The power supplied to the power supply unit 25 may be provided from a universal serial bus (USB) port of a computer, an alternating current (AC) adaptor, a cigar jack and so on.

The central control unit 21 also includes a temperature detector 26, which detects the temperature of the non-contact power transmission apparatus 10 during the charging operation. The central control unit 21 can be constructed to interrupt the charging operation when a temperature detected by the temperature detector 26 indicates overheating, or to suspend the operation of the whole system when the detected temperature indicates overheating of the whole part of the non-contact power transmission apparatus 10.

A current sensing member may also be provided in each of the power supply unit 25, the gate driver module 23, the full bridge resonant converter 22 and the received signal processing module 24 in order to detect a flow of electric current. The non-contact power transmission apparatus 10, particularly, the central control unit 21 can be constructed to interrupt the charging operation or the operation of the system, and generates a corresponding signal when the current sensing member detects an over-current or over-voltage state from a corresponding part.

The non-contact power receiving apparatus 30 is an apparatus that receives a power signal from the non-contact power transmission apparatus 10. As shown in FIG. 2, the non-contact power receiving apparatus 30 generally includes a secondary charge core 32 having a construction corresponding to that of the primary charge core 13 of the non-contact power transmission apparatus 10 so as to generate induced current; a rectifier block 33 connected to the secondary charge core 32 to rectify induced current; a smoothing filter block 34 connected to the rectifier block to filter current and power; a charger integrated circuit (IC) block 36 connected to the rectifier block 33 to charge a battery cell 35 with power; a protection circuit module (PCM) block 37 disposed between the charger IC block 36 and the battery cell 35 to detect current charged to the battery cell 35 and transmit the charge status information of the battery 35 to a power receiver control unit 39 so as to detect the status of the battery, such over-voltage, under-voltage, over-current and short-circuit; and a static voltage regulator block 38 supplying power to the PCM block 37. The power receiver control unit is also provided in the non-contact power receiving apparatus 30, and is constructed to control the rectifier block 33, the smoothing filter block 34, the charger IC block 36, the PCM block 37 and the static voltage regulator block 38 and to monitor an occurrence of an identifier (ID) and a charge status.

The non-contact power receiving apparatus 30 also includes a received power monitor module 31, which monitors power received through the secondary charge coil 32, in order to detect whether or not power is stably received. A reference voltage of a power source, which is received as above, can be variously selected according to the detailed specification of the non-contact power charging system A and the non-contact power receiving apparatus 30. For example, the reference voltage can be set, generally, in the range from 2 to 20V, and when applied to a typical mobile phone device, on the order of 4V.

The received power monitor block 31 includes, as subsidiary components thereof, a low voltage monitor module 311 discerning whether or not received power has a low voltage and a high voltage monitor module 312 discerning whether or not received power has a high voltage.

In the low voltage monitor module 311 as above, the voltage level acting as a reference of a low voltage can be selectively set according to the detailed specification of the non-contact power charging system A and the non-contact power receiving apparatus 30. The voltage level may be set −1V or −0.5V when the reference voltage is set 5V as in the foregoing illustration.

Likewise, the voltage level acting as a reference of a low voltage in the high voltage monitor module 312 can also be selectively set according to the detailed specification of the non-contact power charging system A and the non-contact power receiving apparatus 30. The voltage level may be set +1V or +0.5V when the reference voltage is set 5V as in the foregoing illustration.

The power receiver control unit 39 includes a power signal processing block 393 connected to the smoothing filter block 34 to process a transmission signal about data information on a power signal transmitted from the non-contact power transmission apparatus 10; a charge signal processing block 394 connected to the charge IC block 36 and the PCM block 37 to process a transmission signal about data information on the charge capacity and charge status of the battery cell 35; a signal processing block 392 processing charge capacity information and data information on a unique ID, which are transmitted to the non-contact power transmission apparatus 10 by the control of a device controller 390; and a device memory 391. The device memory 391 stores data information on a unique ID, temporarily stores charge capacity information and charge status data, which are transmitted from the PCM block 37 and the charge IC block 36, and storing data transmitted from the non-contact power transmission apparatus 10. The device controller 390 is also included in the power receiver control unit 39.

Referring to an exemplary construction shown in FIG. 7, a part for monitoring the voltage of power transmitted from the non-contact power transmission apparatus 10 is implemented as the received power monitor module 31 separate from the power receiver control unit 39.

As such, the monitoring part can be constructed as a separate module from the power receiver control unit 39. Further, as shown in FIG. 8, a single control module can be constructed by integrating the power receiver control unit 39 with a received power monitor block 31'. In the case where the power receiver control unit 39 including the received power monitor module 31 (a low voltage monitor block 311' and high voltage monitor block 312') is constructed as a single module, the advantage is that the construction of the non-contact power receiving apparatus 30 can be simplified, thereby reducing the entire size thereof. Another advantage is that lines for monitoring received power can be simplified so as to simplify the entire circuit construction.

While the foregoing embodiment has been illustrated with respect to a voltage-monitoring construction which monitors a received power signal with reference to the upper or lower limit of a voltage, a current-monitoring construction can also be provided alone or in combination with the voltage-monitoring construction. Of course, it can be constructed to monitor both the voltage and the current in order to ensure circuit stability. According to installation conditions, only one of a voltage-monitoring circuit and a current-monitoring circuit can be provided. While following embodiments will be illustrated with respect to the upper or lower limit of a voltage, this is not intended to limit the present invention. Rather, the circuit can also be constructed to monitor received power using the upper and lower limits of current such that power can be stably received.

The non-contact power charging system A as described above has an advantage in that a power signal transmitted from the non-contact power transmission apparatus 10 is stably received in the non-contact power receiving apparatus 30 such that charging power can be transmitted in optimized conditions.

Below, a description will be given of the charging operation of the non-contact power charging system A in accordance with the present invention constructed as above.

In the non-contact power transmission apparatus 10 of the non-contact power charging system A, a power signal is periodically transmitted to the gate output signal processing block 213, the gate driver module 23, the full bridge resonant converter block 22 and the primary charge core 13 through gate signal lines 234 by the control of the central control unit 21 (standby mode S01). In the standby mode S01, the power signal periodically transmitted through the primary charge core 13 includes a call signal that request a unique ID from the non-contact power receiving apparatus 30, and the process stands by for a response signal to the call signal.

In the procedure of standing by for a response signal after the transmission of the unique ID call signal in the standby mode S01, an object is detected using a received detection signal in response to load modulation by the primary charge core 13. The object, which can be placed on the charge plate, may include not only a mobile non-contact power receiving apparatus 30, such as a mobile phone, a PDA, a PMP, a DMB device, an MP3 player or a notebook computer, but also a metallic object, a non-metallic object and an electronic device incapable of non-contact charging. Accordingly, the non-contact power transmission apparatus 10 discerns whether or not any one of the above-described objects is placed on the charge plate by receiving the detection signal in response to load modulation produced by the object.

In the case of load modulation caused by the presence of the non-metallic object or the movement of the object, the operation may convert to the standby mode S01 unless there is a specific problem. However, in the case of the metallic object or electronic device incapable of non-contact charging rather than the non-contact power receiving apparatus 30, the charging operation may bring in heating or malfunction.

To this end, a foreign material is monitored by parasitic metal detection (PMD). That is, when the detection signal in response to load modulation caused by an object is detected by the primary charge core 13 and the received signal processing module 24, this procedure is carried out to discern whether or not the detection signal is a normal signal. Particularly, the procedure discerns whether or not the detection signal is an abnormal signal incapable of signal discerning by comparing the detection signal with a signal generated by the control of the central control unit 21. If the object is detected as a foreign material, the process converts into a foreign material detection status, causes the LCD panel 153 or the charge status indicator LED module 154 to display a foreign material error (a PMD error) if the foreign material is a metallic object or an electronic device. Further, the charging operation is interrupted.

If the received detection signal is discerned as data information on the unique ID of the non-contact power receiving apparatus 30 that can be charged without contacts, the received detection signal in response to load modulation is analyzed and discerned (unique ID discerning S02). In the standby mode S01, a search signal for the non-contact power receiving apparatus 30 is transmitted and a call signal requesting data information on the unique ID of the non-contact power receiving apparatus is also transmitted. Correspondingly, in the non-contact power receiving apparatus 30, induced current from the secondary charge core 32 is rectified by the rectifier block 33 and is then filtered by the smoothing filter block 34. During this procedure, the call signal requesting the unique ID data information is transmitted to the device controller 390 of the power receiver control unit, and correspondingly, unique ID data of the non-contact power receiving apparatus 30 stored in the device memory 391 is transmitted to the non-contact power transmission apparatus 10 through the signal processing block 392. Then, the main control unit 210 discerns whether or not the corresponding non-contact power receiving apparatus is a normal apparatus that can be charged without contacts. That is, the main control unit 210 discerns whether or not the received data is a unique ID data type of a normal non-contact power receiving apparatus, and then discerns whether or not the received data is unique ID data transmitted from a normal non-contact power receiving apparatus.

If the received data is discerned as unique ID data transmitted from a normal non-contact power receiving apparatus, the primary charge core 13 is caused to generate a full power transmission signal through the gate driver module 23 (full power transmission S03).

Describing the full power transmission S03 in the non-contact power transmission apparatus 10, the main controller 210 of the central control unit 21 determines that a normal non-contact power receiving apparatus is placed on the charge plate (not shown), thereby generating a control signal to transmit a power signal through the gate output signal processing block 213 and the gate signal lines 234.

The control signal generated as above is transmitted to the gate driver module 23 and is transmitted through the full bridge resonant converter 22 to the primary charge core 13, which then generates an induced magnetic field, such that the power signal is transmitted to the non-contact power receiving apparatus.

The gate signal lines 234 and the gate driver module 23, associated with the above-described process, can have a construction as rendered in a following embodiment.

The control signal of the main controller 210 is transmitted through the gate signal lines 234 to the gate driver module 23. The gate driver module 23 can be constructed to include a gate signal converter 232 performing gate signal processing on the control signal, an output driver 233 transmitting the processed signal to the full bridge resonant converter 22, a gate controller 231 and so on.

The gate controller 231 can be constructed to control the signal transmitting/receiving and processing operations in the gate driver module 23. Thereby, the control signal from the main controller 210 is transmitted to corresponding parts, and a resultant power signal is transmitted and an induced magnetic field is stably generated.

Next, in the charging operation, a signal requesting charge statue information is transmitted to the non-contact power receiving apparatus 30, and the charge level of the non-contact power receiving apparatus 30 is adjusted based on the charge status information (adjustment of charging S04).

Then, after the full power transmission S03, the non-contact power receiving apparatus 30 charges the power, supplied through the rectifier block 33 and the smoothing filter block 34, in the battery cell 35 through the charge IC block 36 and the PCM block 37 by the control of the device controller 390.

In response to this charging operation, the device controller 390 is inputted with information on the charge status through the charge IC block 36 and the PCM block 37, and temporarily stores the charge status information in the device memory 391. When the battery cell 35 is fully charged, the device controller 390 controls the charge IC block 36 to terminate the charging operation and controls to generate fully-charged status information from the secondary charge core 32 through the signal processing block 392. Further, if the voltage of the charged battery cell 35 is lower than a predetermined reference voltage, the charging operation can be resumed. If it is discerned fully-charged status, the charging operation is terminated (No operation).

Accordingly, in the adjustment of charging S04, the main controller 210 of the non-contact power transmission apparatus 10 requests status information on stepwise charge level from the non-contact power receiving apparatus 30. As a response, the device controller 390 of the non-contact power receiving apparatus 30 transmits the charged status information to the non-contact power transmission apparatus 10 by load modulation.

The charged status information from the non-contact power receiving apparatus is transmitted through the received signal processing module 24 to the main controller 210 connected to the received signal processing block 214. The signal processing module 24 includes a received signal input 243 receiving a signal detected by load modulation, a received signal processor 242 converting the signal detected by load modulation and a received signal controller 241 controlling the operation of the received signal processing module 24.

According to this construction, the transmission information of the non-contact power receiving apparatus 30 received through load modulation is signal-converted in the received signal processing module 24 and is then transmitted to the main controller 210 through the received signal processing block 214. The received signal processing module 24 may generally include a plurality of amplifiers, a low pass filter (SPF), an OR circuit and so on.

When signals in response to load modulation are transmitted, a plurality of the received signal processors 242, constructed in accordance with an embodiment, processes respective signals and transmits the processed signals to the main controller 210 through received signal lines 244.

Accordingly, the non-contact power transmission apparatus 10 requests the data information on the charge level of the non-contact power receiving apparatus 30, particularly, via the gate driver module 23 and the primary charge core 13. As a response, the non-contact power receiving apparatus 30 transmits the data information on the charge level of the battery cell 35, received via the charge IC block 36 and the PCM block 37, to the non-contact power transmission apparatus 10. The data information is then transmitted to the main controller 210 through the primary charge core 13 and the received signal processing module 24.

As an alternative construction, when the voltage of the power signal received from non-contact power receiving apparatus 30 is determined to be lower or higher than a reference voltage, a corresponding signal can be transmitted to the non-contact power receiving apparatus 10 so as to adjust the voltage of the power signal. For example, as shown in FIG. 18, when the non-contact power receiving apparatus 30 moves to an outer area while being properly charged in the central area of the charge plate, the voltage of a received power signal is relatively lowered. To compensate for the lowered value, a voltage step-up request signal is transmitted to the non-contact power transmission apparatus 10. Conversely, as shown in FIG. 19, when the non-contact power receiving apparatus 30 moves to the central area from the outer area of the charge plate, a relatively better power signal is received, in which the voltage of the power signal is relatively raised. Then, a voltage step-down request signal is transmitted to the non-contact power transmission apparatus 10 in order to stably receive power.

Describing the adjustment of charging S04 during the charging operation in accordance with an embodiment of the present invention, the non-contact power transmission apparatus 10 requests data on the charged status information (charge capacity information) from the non-contact power receiving apparatus 30. As a response, the non-contact power receiving apparatus 30 transmits a signal including charge information data, such as the charge capacity data and the charged status information on the voltage of received power, and the non-contact power transmission apparatus receives the signal including the charge information data (step of receiving charge information data S042).

Data analysis and discerning is performed on the charged status information of the power signal transmitted from the non-contact power receiving apparatus (step of discerning power data S043). A compensation frequency with respect to the voltage data on the power signal transmitted from the non-contact power receiving apparatus 30 is calculated and a compensated power signal having the compensation frequency is transmitted (step of transmitting compensated power signal S044).

In the above-mentioned example, the voltage of the received power signal acting as a reference in the non-contact power receiving apparatus 30 was 5V. In this case, it is assumed that the voltage 5V be stably received when the non-contact power receiving apparatus 30 does not move. However, when the voltage of the received power signal drops or rises in response to the movement of the non-contact power receiving apparatus 30, the non-contact power transmission apparatus 10 modifies the frequency of the transmission power signal in order to compensate for a variation in the voltage of the received power signal, such that the non-contact power receiving apparatus 30 can receive the power signal at a stable voltage.

Accordingly, a compensation frequency variation $.DELTA.f$ of the transmitting power signal can be suitably determined based on the setting of the non-contact charging system A, the non-contact power transmission apparatus 10 and the non-contact power receiving apparatus 30. For example, the compensation frequency variation $.DELTA.f$ can be variously set with 10 Hz, 50 Hz, 100 Hz, 500 Hz, 1 KHz, 2 KHz, 5 KHz and so on.

Based on data indicating the charge level of the non-contact power receiving apparatus 30, the main controller 210 of the central control unit 21 displays the charge level or the state information using letters or a diagram on the LCD panel 153 through the signal output block 212 and also controls the charge status indicator LED module 154 to indicate the charging operation. Further, the charge status indicator LED module 154 is lighted in various fashions to indicate different statuses. For example, the charge status indicator LED module 154 may be turned off to indicate the termination of the charging operation, or flicker to indicate the charging operation. In addition, a green lamp of the charge status indicator LED module 154 may be turned on to indicate the fully-charged status, and a red lamp of the charge status indicator LED module 154 may be turned on to indicate an error caused by a foreign material, a unique ID error, and etc.

When the non-contact power receiving apparatus 30 moves on or from the charge plate during the charging operation, the power signal transmitted from the non-contact power transmission apparatus 10 can be varied so as to optimize the charging efficiency of the non-contact power receiving apparatus 30.

Then, information on the fully-charged status is received from the non-contact power receiving apparatus 30, the fully-charged status is displayed using the LCD panel 153 or the charge status indicator LED module 154, corresponding to a charging block 14, and the charging operation in the charging block 14 is terminated (fully-charged stage S06).

Preferably, the user can remove the fully-charged non-contact power receiving apparatus 30 from the stopped charging block 14, and leave the charging block 14 in the standby mode until a starting signal is inputted.

In the case of foreign material error (a PMD error) or ID error status, an error status is displayed and the operation is interrupted in order to ensure stability for the non-contact power transmission apparatus 10, the non-contact power receiving apparatus 30, a metallic object, or another electronic device. Accordingly, when the operation is interrupted due to an error, the process can preferably remain in the standby mode until a restarting signal is inputted from the user.

Of course, in the case of the error status or the fully-charged status, a pulse signal can be periodically transmitted, the non-contact power receiving apparatus 30 can be detached or the foreign material can be removed so as to remove the error based on a signal caused by resultant load modulation. Then, the process can be converted into a normal standby mode.

Furthermore, when the power signal is received in response to the request signal from the non-contact power transmission apparatus 10, the device controller 390 of the non-contact power receiving apparatus 30 can control the data value of the voltage of the power signal to be transmitted to the non-contact power transmission apparatus 10.

A description will be given of charge-related procedures in the non-contact power receiving apparatus 30. In the standby mode of the non-contact power receiving apparatus 30 for receiving a power signal, a call signal, transmitted together with an object detection signal from the primary charge core 13 of the non-contact power transmission apparatus 10, is detected. Here, the call signal calls the unique ID value of the non-contact power receiving apparatus 30. Then, a signal on the unique ID value of the non-contact power receiving apparatus 30 is transmitted to the non-contact power transmission apparatus (unique ID value transmitting step S21).

After the unique ID value transmitting step S21, the process is converted into a charge standby mode and a power signal received from the non-contact power transmission apparatus 10 is rectified and is then charged in the battery cell 35 (charging step S22).

Accordingly, a monitor module can be constructed to monitor the voltage of a power signal received from the non-contact power transmission apparatus 10 in response to a request or by the control of the device controller 390. It is discerned whether or not the voltage of the received power signal is a reference voltage, if the voltage of the received power signal is below the reference voltage, a voltage adjustment signal is transmitted to request voltage step-up. Conversely, if the voltage of the received power signal is above the reference voltage, the voltage adjustment signal requests voltage step-down (voltage adjustment requesting step S23).

When a voltage received after the voltage adjustment requesting step S23 is a reference voltage, a signal indicative of normal reception is transmitted (normal voltage signal transmitting step S24). It is discerned whether or not the battery cell 35 is fully charged, and in the case of the fully-charged status, the charging operation is terminated (charging operation terminating step S25).

In the voltage adjustment requesting step S23, the level of the voltage of the received power signal can be discerned, and the charge level of the battery cell 35 can also be discerned.

In the case of discerning the voltage of the received power signal, as shown in FIG. 18 where the non-contact power receiving apparatus 30 is moved to the outer area from the central area of the non-contact power transmission apparatus 10, received power is temporarily weakened since the non-contact power receiving apparatus 30 is located relatively in an outer position with respect to the primary charge core 13.

When a normally-received voltage is 5V, the low voltage monitor module 311 of the received power monitor module 31 detects a voltage 4.5V indicative of a voltage drop −0.5V. Accordingly, a signal requesting the stepping-up of transmission power (a power-up request signal) is transmitted to the non-contact power transmission apparatus 10.

Further, as shown in FIG. 19, the non-contact power receiving apparatus 30 is moved to the central area from the outer area of the non-contact power transmission apparatus 10, where a stable voltage of about 5V is received. Here, received power is temporarily intensified since the non-contact power receiving apparatus 30 is located relatively in a central position with respect to the primary charge core 13. Then, the low voltage monitor module 311 of the received power monitor module 31 detects a voltage 5.5V indicative of a voltage rise 0.5V. Accordingly, a signal requesting the stepping-down of transmission power (a power-down request signal) is transmitted to the non-contact power transmission apparatus 10.

As a result, the non-contact power transmission apparatus 10 can modify the frequency of the transmission power signal, such that the power signal can be received and charged at a more stable voltage. The stable reception of the voltage can be observed from graphs of FIGS. 13 to 16.

Below, a detailed description will be given of the power control process in accordance with the adjusting of charging.

As shown in FIGS. 7 and 13 to 16, a power signal transmitted from the primary charge core 13 of the non-contact power transmission apparatus 10 is received through the secondary charge core 32 of the non-contact power receiving apparatus 30. Here, information on the intensity of the input voltage of the power signal is sent to the device controller 390.

If the voltage of the received power signal is detected as being transmitted at a stable voltage (e.g., 5V), the voltage can preferably be maintained to be uniform. Conversely, if the voltage of the received power signal is too low or high, information on voltage adjustment is transmitted by load modulation to the non-contact power transmission apparatus 10, such that a uniform value of voltage can be received. When the voltage is adjusted to be uniform, the operation of the charge IC of the charge IC block 36 of the non-contact power receiving apparatus 30 is activated by the control of the device controller 390, such that the power can be charged in the battery cell 35.

While the power transmitted from the non-contact power transmission apparatus 10 is charged in the battery cell 35 of the non-contact power receiving apparatus 30, the PCM block 37 discerns whether or not the battery cell 35 is stabilized in order to ensure a stable charging operation.

In the charging operation of the non-contact power charging system A including the non-contact power transmission apparatus 10 and the non-contact power receiving apparatus 30, as shown in FIGS. 18 and 19, when the non-contact power receiving apparatus 30 moves on the charging plate of the non-contact power transmission apparatus 10, the primary charge core 13 and the secondary charge core 32 are relocated, thereby dropping the receptibility of the power signal in the non-contact power receiving apparatus 30. The location of the primary charge core 13 and the secondary charge core 32 becomes less efficient with the distance between the centers of the cores, such that induced electromotive force is rarely generated from the primary charge core 13 and the secondary charge core 32.

Accordingly, in the non-contact power charging system A of the present invention, when the voltage of the power signal received in the non-contact power receiving apparatus 30 placed on the charging block drops below or rises above the reference voltage, a compensation request signal is transmitted to the non-contact power transmission apparatus 10, requesting the non-contact power transmission apparatus 10 to transmit a compensated power signal.

For example, it is assumed that the reference voltage of the received power signal be 5V and a reference variation of the received voltage be +/−0.5V. As shown in FIG. 18, when the non-contact power receiving apparatus 30 is moved from the central portion to the outer portion, a voltage lower than 4.5V is received. Then, the control of the device controller 390 of the non-contact power receiving apparatus control unit 39 controls to transmit a voltage step-up request signal, such that the voltage is stepped up about 0.5V. Here, the secondary charge core 32 is controlled through the signal processing block 392 to transmit the voltage step-up request signal.

Further, as shown in FIG. 19, when the non-contact power receiving apparatus 30 is moved from the outer portion to the central portion, a voltage higher than 5.5V is received. Then, the control of the device controller 390 of the non-contact power receiving apparatus control unit 39 controls to transmit a voltage step-down request signal, such that the voltage is stepped down about 0.5V. Here, the secondary charge core 32 is controlled through the signal processing block 392 to transmit the voltage step-down request signal.

In response to the voltage step-up request signal or the voltage step-down request signal, the non-contact power transmission apparatus 10 transmits a compensated power signal, which is compensated for 0.5V. As an example of increasing the power signal transmitted from the non-contact power transmission apparatus 10, it can be controlled to modify the oscillation frequency.

As such, the power signal transmitted from the non-contact power transmission apparatus 10 is adjusted according to the location of the non-contact power receiving apparatus 30. The charging efficiencies according to the replacement are illustrated in the graphs of FIGS. 13 to 16.

In the test reported in FIGS. 13 to 16, the reference power in the secondary side of the non-contact power receiving apparatus 30 was on the order of 2.5 W. While the non-contact power receiving apparatus 30 was being moved horizontally and vertically moved on the charging plate of the non-contact power transmission apparatus 10 to a distance ranging from −7 mm to 7 mm, primary side power W at the non-contact power transmission apparatus 10, secondary side power W at the non-contact power receiving apparatus 30 and the resultant efficiency (%) were measured and calculated. The efficiency (%) is produced by dividing the output power in the secondary side of the non-contact power receiving apparatus 30 with the input power in the primary side of the non-contact power transmission apparatus 10 as expressed in the formula:

efficiency(%)=(secondary side power)/(primary side power)*100.

Figure 11:
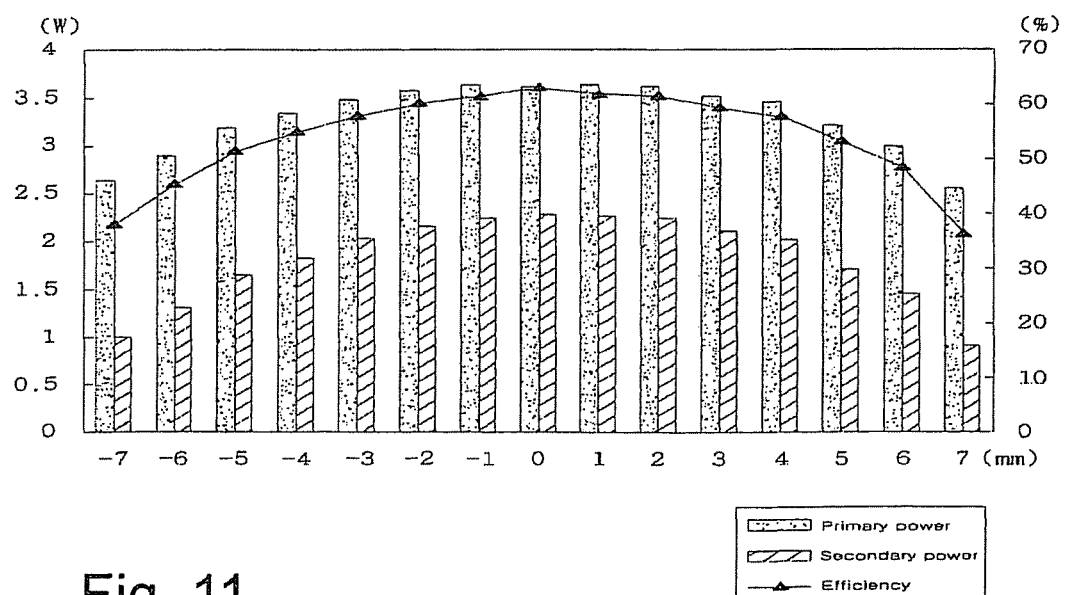
FIGS. 11 and 12 are graphs illustrating power control efficiencies of the prior art.
Figure 12:
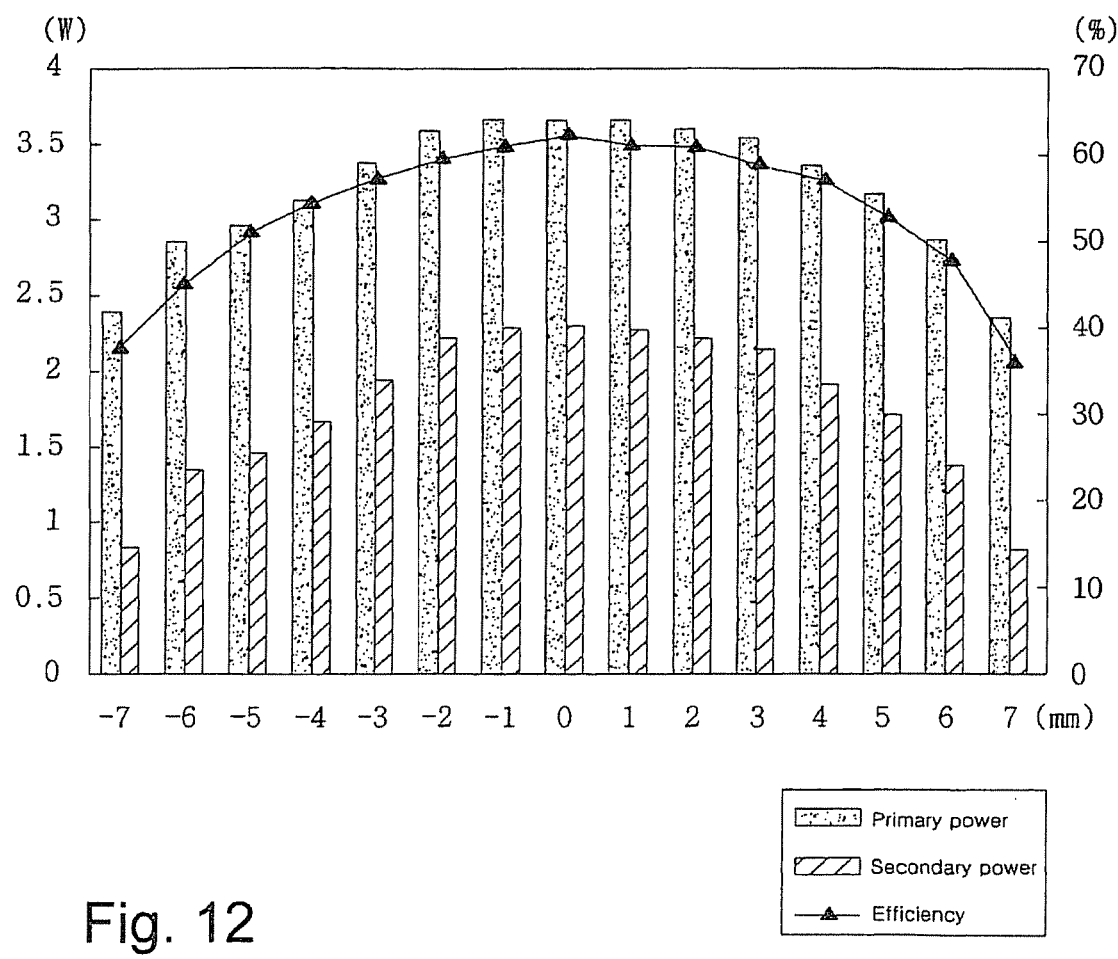

In the meantime, FIGS. 11 to 14 illustrate graphs related with power compensation tests, in which transmission power compensation was 0.5 W, and the secondary side power in the non-contact power receiving apparatus was in the range from 2 to 2.5 W. Here, the charging efficiency in the non-contact power transmission apparatus was obtained by changing the horizontal and vertical distance between the non-contact power transmission apparatus and the non-contact power receiving apparatus. Particularly, FIGS. 11 and 12 illustrate cases in which power compensation according to frequency modification was not applied. Here, when the non-contact power receiving apparatus was moving horizontally or vertically with respect to the non-contact power transmission apparatus, the secondary side power of the non-contact power receiving apparatus decreased with the distance from the center, thereby lowering the charging efficiency.

Figure 13:
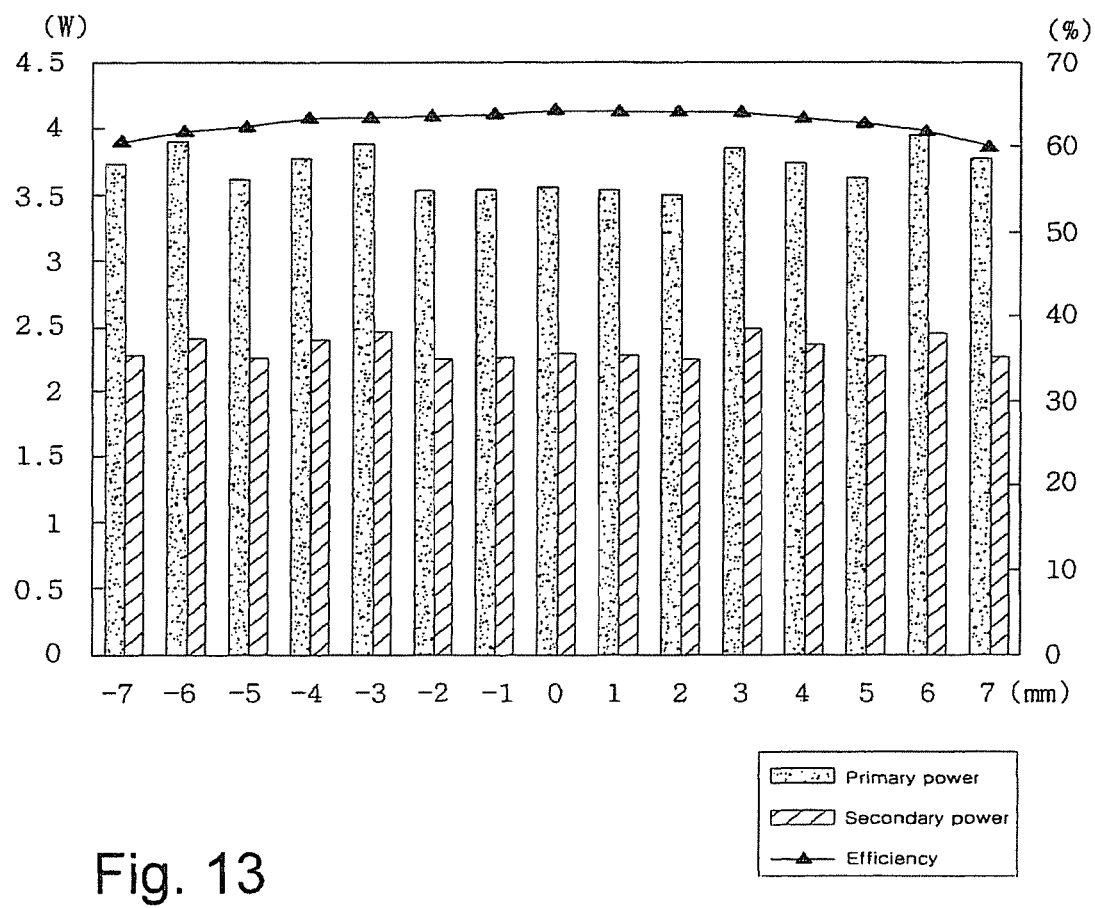
FIGS. 13 through 16 are graphs illustrating power control efficiencies of the non-contact power charging system in accordance with the present invention.
Figure 14:
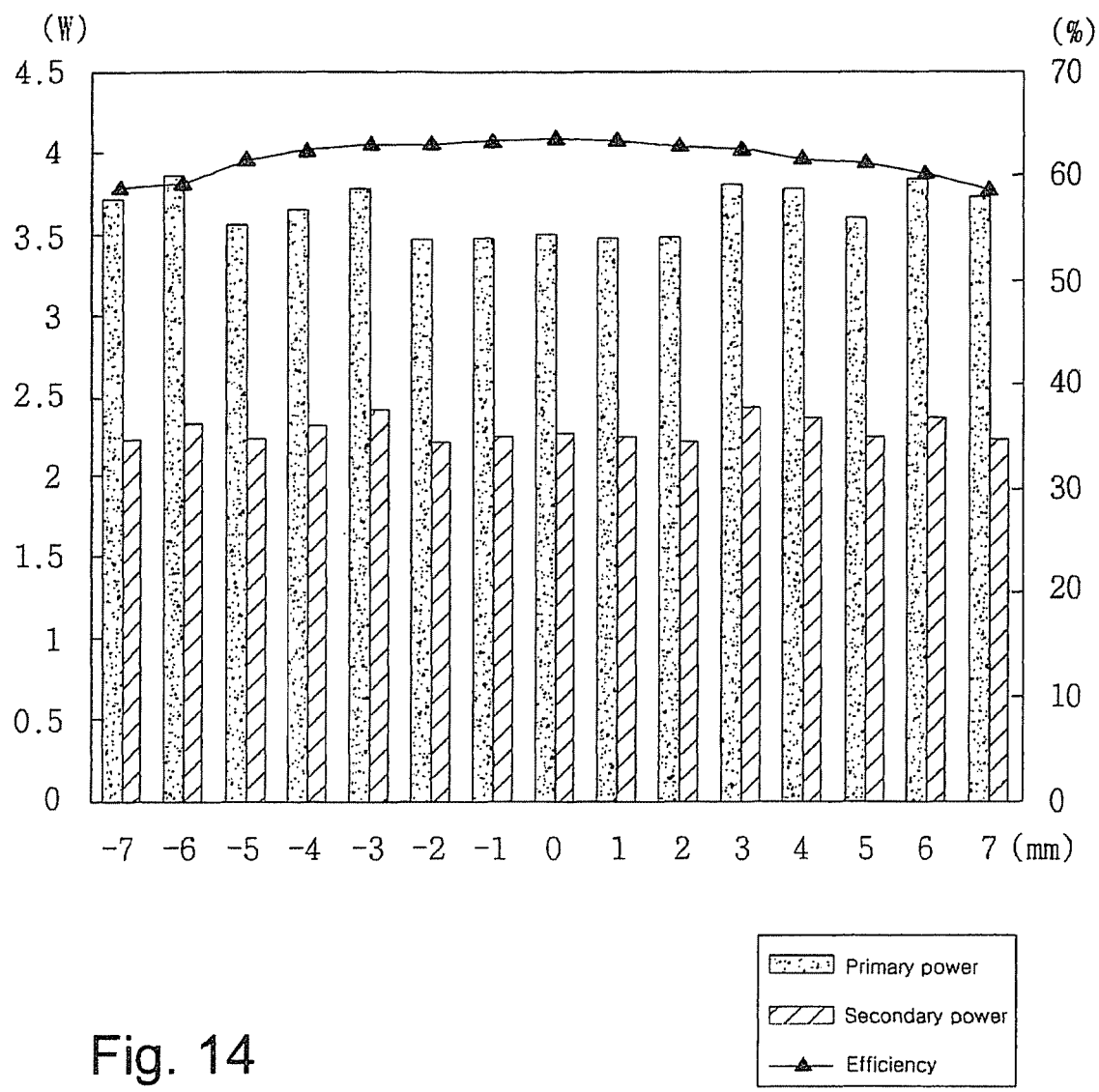

Comparatively, FIG. 13 shows a graph resulting from horizontal movement and FIG. 14 shows a graph resulting from vertical movement in the non-contact charging system A of the present invention. Information on the voltage variation of the received power in the non-contact power receiving apparatus was transmitted when the non-contact power receiving apparatus 30 was moving horizontally or vertically on the top surface of the charging block 14 of the non-contact battery pack as an example of the non-contact power transmission apparatus 10. In response to this information, the non-contact power transmission apparatus 10 controlled (compensates for) power through frequency modification. Referring to the efficiencies in the graphs, power transmission was stable and thus power transmission efficiency was also good.

Figure 15:
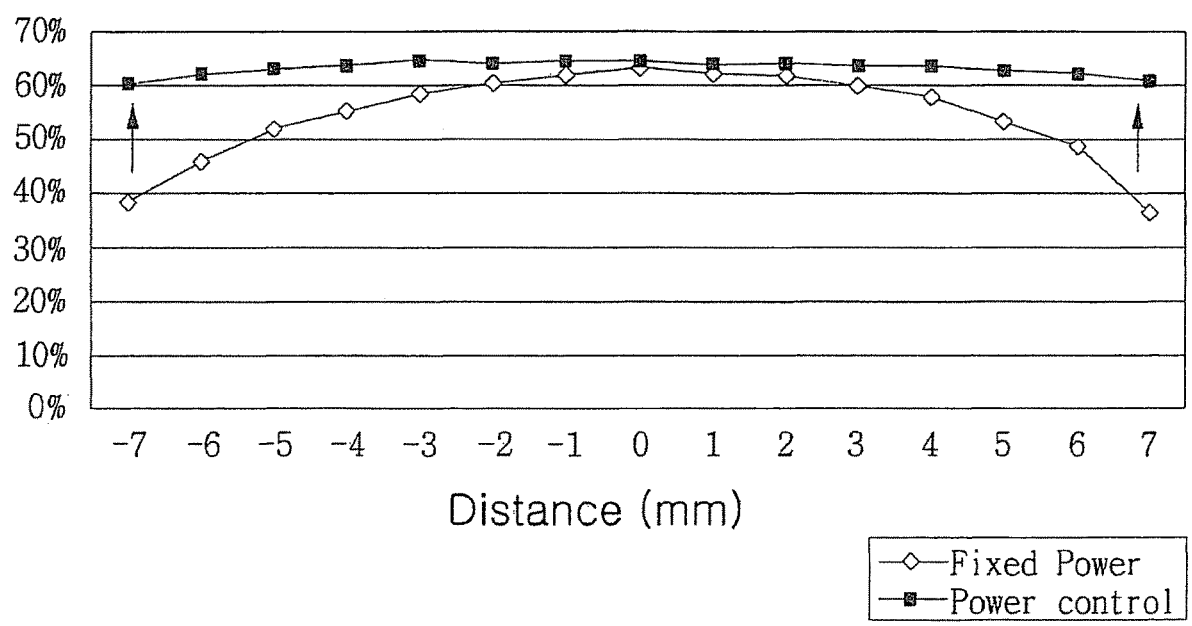
Figure 16:
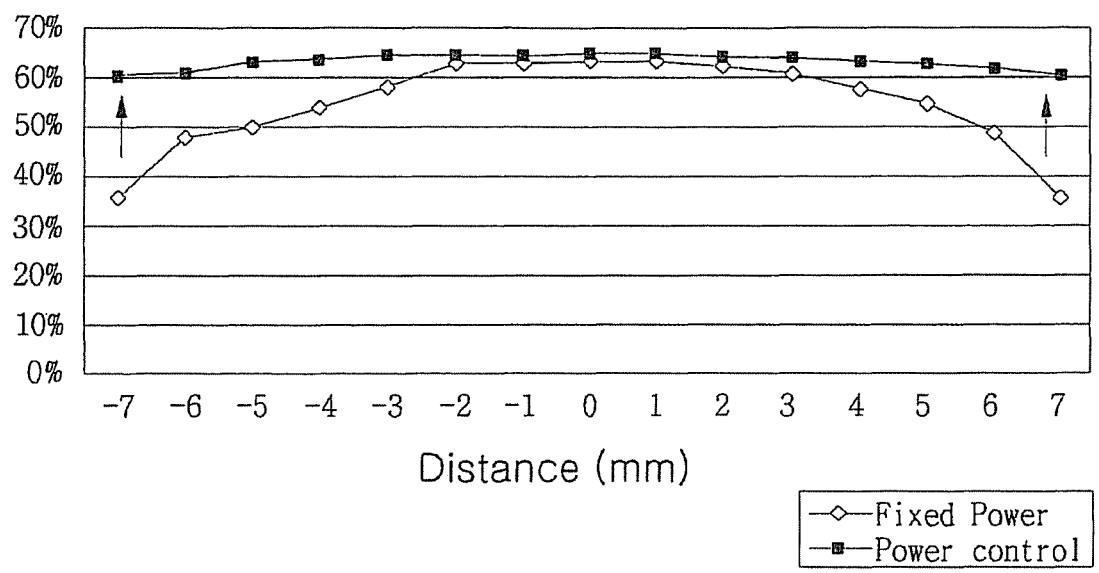

FIG. 15 is an efficiency graph related with the horizontal movement, and FIG. 16 is an efficiency graph related with the vertical movement. Referring to FIGS. 15 and 16, the charging efficiencies of compensated power transmission according to frequency modification (square-dotted profiles in the upper part, Power Control) were better than those without compensated power transmission according to frequency modification (circle-dotted profiles in the lower part, Fixed Power).

Accordingly, the non-contact power charging system A including the non-contact power transmission apparatus 10 and the non-contact power receiving apparatus can stably transmit power without contacts. The non-contact power transmission apparatus 10 and the non-contact power receiving apparatus 30 of the non-contact power charging system A can be used as a stable system.

When the user touches the non-contact power receiving apparatus 30 or the non-contact power transmission apparatus 10 shakes during the charging operation, the relative location of the primary charge core of the non-contact power transmission apparatus 10 and the secondary charge core of the non-contact power receiving apparatus 30 may be changed. However, the charging power compensation as described above makes it possible to charge the non-contact power receiving apparatus 30 with a stable voltage, such that the non-contact power receiving apparatus 30 can be charged in succession before being fully charged.

As shown in FIGS. 9, 10 and 17, the non-contact power receiving apparatus 30 of the present invention also includes a shield member, which protects the non-contact power receiving apparatus 30 and the battery cell 35 from a magnetic field generated by the primary charge core 13 of the non-contact power transmission apparatus 10 and the secondary charge core 32 of the non-contact power receiving apparatus 30.

Firstly, FIG. 9 is an exploded perspective view illustrating the construction of the non-contact power receiving apparatus 30 having a wireless power receiver module. The non-contact power receiving apparatus 30 is made of a coil, fine metal, a thin sheet of aluminum (e.g., an aluminum foil), and lithium ion or lithium polymer includes Aluminum in order to shield a magnetic field 100%, so that the cell can be free from the influence of the magnetic field. As a result, the cell can be charged and discharged for a predetermined cycle of 500 times or more. Here, the secondary charge core can have any core shapes. That is, the shape of the secondary charge core can include a quadrangle, a circle and an ellipse, and can be implemented as various types of cores such as a wound core and a spiral core. Accordingly, the non-contact power receiving apparatus 30 having a wireless power receiver module includes a wireless power receiver circuit 40 on one lateral side of the rechargeable battery cell 35 and a shied member 41 surrounding the wireless power receiver circuit 40. The wireless power receiver circuit 40 is constructed including some parts of the non-contact power receiving apparatus 30, such as the power receiver control unit 39 and the charge IC block 36.

Further, shielding plates 42, 43, 44, 45 and 46 are provided on the bottom and four side surfaces of the battery cell 35, respectively, to shield a magnetic field from the primary charge core and the secondary charge core 32 so as to protect the battery cell 35 from the magnetic field.

A total of five (5) shielding plates 42 to 46 is provided in total five directions including the four lateral directions and the downward direction of the battery cell 35 to completely shield the magnetic field from the primary charge core and the secondary charge core 32 so as to protect the battery cell 35 from being damaged by the magnetic field. Alternatively, a shielding plate can also be provided on the top surface of the rechargeable battery cell 35 if temperature rise due to the completely-enclosed structure of the battery cell 35 does not cause a trouble.

The shielding plates 42 to 46 and the shielding member 41 can be formed as a thin sheet of metal such as Al, Cu or Ni alloy.

Further, magnetic plates 48 are provided between the shielding plate 46, which is placed under the battery cell 35, and a charge receiver module 321 having the secondary charge core 32. The magnetic plates 48 help the magnetic field be better induced to the secondary charge core 32. The magnetic plates 48 may be constructed of amorphous ferrite, Mn—Zn (50 parts by weight: 50 parts by weight), Ni—Fe (80 parts by weight: 20 parts by weight), or fine metal (Fe—Si—Cu—Nb).

The magnetic plates 48 include an upper magnetic plate 481, placed between the shielding plate 46 and the charge receiver module 321, and a lower magnetic plate, placed under the charge receiver module 321. The lower magnetic plate 482 is formed with a lower plate through-hole 483, which extends vertically through the lower magnetic plate 482, particularly, the central portion of the lower magnetic plate 482. The shape of the lower plate through-hole 483 may preferably conform to that of the secondary charge core 32. Accordingly, FIG. 16 illustrates an example in which the lower plate through-hole 483 of the lower magnetic plate 482 was circular-shaped in order to conform to the circular shape of the secondary charge core 32. Of course, when the core is quadrangular- or polygonal-shaped, the lower plate through-hole 483 may preferably be shaped in the same shape. The lower plate through-hole 483 configured as above helps induced electromotive force be better formed in the second charge core 32 in an induced magnetic field and signals be better transmitted.

An insulating plate 47 is further provided between the battery cell 35 and the shielding plate 46 below the battery cell 35 to insulate the battery cell 35. The insulating plate 47 is implemented with a mesh member or a thin film of Ni—Cu so as to prevent the heat of the shielding plate 46 from being conducted to the battery cell 35.

FIG. 10 shows another form of the magnetic field shielding member, which includes a battery cell case 35' of aluminum encasing the battery cell 35, a magnetic plate 48 of first Hanrim Postech electro-magnetic shield (HPES), which is placed between the battery cell case 35' and the secondary charge core 32, and a shielding mesh member 49 of second HPES, which is sandwiched between the magnetic plate 48 of first HPES and the battery cell case 35'. The magnetic plate 48 of first HPES and the shielding mesh member 49 of second HPES can have a composition the same as that of the above-described shielding member.

The magnetic plate 48 of first HPES shields a majority of magnetic field, such that magnetic lines of force are bent by the magnetic plate 48 acting as a shielding plate, and thereby do not influence on the battery cell (see FIG. 17). The magnetic lines of force generate heat in the top portion, and the heat is dissipated to the outside by the magnetic plate 48 made of metal. Further, the shielding mesh member 49 of second HPES is constructed with a mesh metal sheet coated with a coating agent composed of amorphous ferrite, Mn—Zn (50 parts by weight: 50 parts by weight), Ni—Fe (80 parts by weight: 20 parts by weight), or fine metal (Fe—Si—Cu—Nb). As such, the shielding mesh member 49 of second HPES serves to shield a remaining portion of the magnetic lines of force, which are not shielded by the magnetic plate 48 of first HPES. The mesh metal sheet of the shielding. mesh member 49 of second HPES generate eddy current, which in turn protects the battery pack from the magnetic field generated by the primary charge core and the secondary charge core. According to tests, the magnetic plate 48 of first HPES shields about 90% and the shielding mesh member 49 shields about 10% of the magnetic field.

500 times (500 cycles) of charging/discharging tests were performed on the non-contact power receiving apparatus 30 to which the magnetic plate 48 of first HPES and the shielding mesh member 49 of second HPES are applied. In FIG. 17, the reference was that the battery and the charging system were not charged and discharged without contacts but were charged and discharged via wires. When 500 times of charging and discharging were stably repeated, an efficiency curve of about 80% was set as reference efficiency segment (D). In FIG. 17, the graph shows the test results compared to the reference efficiency segment (D) of about 80%. Here, "N" indicates a resultant profile of a test using electrical contacts connected by wires without exposure to a magnetic field. The profile "N" of this test is positioned above the reference efficiency segment, thereby showing stable efficiency.

Comparably, in FIG. 17 indicates a profile of a test using the non-contact power receiving apparatus 30 of the invention, to which the magnetic plate 48 of first HPES, the shielding mesh member 49 and the like were applied. In this test profile, stable efficiency of 83.9% was observed at 500 times of charging and discharging.

However, when second HPES was not applied (i.e., in a profile indicated with "B" in FIG. 17), efficiency of 75.3% was observed at 460 times of charging and discharging. When neither first HPES nor second HPES was applied (i.e., in a profile indicated with "C" in FIG. 17), poor efficiency of 74.5% was observed at 340 times of charging and discharging, which fall short of the reference 500 times. It can be understood that the test of the invention has much better efficiency.

While the present invention has been described with reference to the particular illustrative embodiments and the accompanying drawings, it is not to be limited thereto. Accordingly, the foregoing embodiments can be suitably modified and altered, and such applications fall within the scope and spirit of the present invention that shall be defined by the appended claims.

What is claimed is:

1. A non-contact power receiver apparatus comprising:
a secondary core configured to receive a wireless power signal from a non-contact power transmission apparatus; and
a controller configured to:
cause the non-contact power receiver apparatus to transmit identification (ID) information to the non-contact power transmission apparatus based on a received signal from the non-contact power transmission apparatus, the ID information configured to identify the non-contact power receiver apparatus;
determine a power adjustment request based on a comparison between a level of the wireless power signal and a reference level, wherein the power adjustment request comprises a request to increase the level of the wireless power signal when the level of the wireless power signal is lower than the reference level, and wherein the power adjustment request comprises a request to decrease the level of the wireless power signal when the level of the wireless power signal is greater than the reference level; and
cause the non-contact power receiver apparatus to transmit the power adjustment request to the non-contact power transmission apparatus,
wherein the secondary core is to receive an adjusted power signal from the non-contact power transmission apparatus based on the power adjustment request.

2. The non-contact power receiver apparatus of claim 1, wherein the controller is configured to determine the power adjustment request according to a difference between the reference level and the level of the wireless power signal.

3. The non-contact power receiver apparatus of claim 1, wherein the controller is configured to determine the power adjustment request to include the request to decrease the level of the wireless power signal according to a negative subtraction result of a subtraction of the level of the wireless power signal from the reference level, and wherein the controller is configured to determine the power adjustment request to include the request to increase the level of the wireless power signal according to a positive subtraction result of the subtraction of the level of the wireless power signal from the reference level.

4. The non-contact power receiver apparatus of claim 1, wherein the controller is configured to monitor a difference between the reference level and the level of the wireless power signal; and, based on the difference between the reference level and the level of the wireless power signal, to select between setting the power adjustment request to include the request to increase the level of the wireless power signal and setting the power adjustment request to include the request to decrease the level of the wireless power signal.

5. The non-contact power receiver apparatus of claim 1, wherein the reference level comprises a voltage reference level, and the level of the wireless power signal comprises a voltage level corresponding to the wireless power signal.

6. The non-contact power receiver apparatus of claim 1, wherein the reference level comprises a current reference level, and the level of the wireless power signal comprises a current level corresponding to the wireless power signal.

7. The non-contact power receiver apparatus of claim 1, wherein the ID information is configured to uniquely identify the non-contact power receiver apparatus.

8. The non-contact power receiver apparatus of claim 1, wherein the power adjustment request is to indicate a requested adjustment size to adjust the wireless power signal.

9. The non-contact power receiver apparatus of claim 1, wherein the controller is configured to cause the non-contact power receiver apparatus to operate at a power charge mode after transmission of the ID information, and to transmit the power adjustment request to the non-contact power transmission apparatus at the power charge mode.

10. The non-contact power receiver apparatus of claim 1, wherein the controller is configured to cause the non-contact power receiver apparatus to transmit to the non-contact power transmission apparatus charge status information to identify a charge status of the non-contact power receiver apparatus.

11. The non-contact power receiver apparatus of claim 1, wherein the controller is configured to cause the non-contact power receiver apparatus to transmit to the non-contact power transmission apparatus a full charge indication.

12. The non-contact power receiver apparatus of claim 1, wherein the controller is configured to cause the non-contact power receiver apparatus to transmit the power adjustment request to the non-contact power transmission apparatus by load modulation.

13. The non-contact power receiver apparatus of claim 1 comprising a battery, and a charger to charge the battery with power from the wireless power signal.

14. The non-contact power receiver apparatus of claim 13 comprising a charge status indicator to indicate a charging status of the battery.

15. An apparatus of a non-contact power receiver device, the apparatus comprising:
a memory to store identification (ID) information configured to identify the non-contact power receiver device; and
a processor configured to configure an adjustment of a wireless power signal to be received at a secondary core of the non-contact power receiver device from a non-contact power transmission device, the processor configured to:
cause the non-contact power receiver device to transmit the ID information to the non-contact power transmission device based on a received signal from the non-contact power transmission device;
determine a power adjustment request based on a comparison between a level of the wireless power signal from the non-contact power transmission device and a reference level, wherein the power adjustment request comprises a request to increase the level of the wireless power signal when the level of the wireless power signal is lower than the reference level, and wherein the power adjustment request comprises a request to decrease the level of the wireless power signal when the level of the wireless power signal is greater than the reference level;
cause the non-contact power receiver device to transmit the power adjustment request to the non-contact power transmission device; and
observe an adjusted power signal received at the secondary core from the non-contact power transmission device based on the power adjustment request.

16. The apparatus of claim 15, wherein the processor is configured to determine the power adjustment request according to a difference between the reference level and the level of the wireless power signal.

17. The apparatus of claim 15, wherein the processor is configured to determine the power adjustment request to include the request to decrease the level of the wireless power signal according to a negative subtraction result of a subtraction of the level of the wireless power signal from the reference level, and wherein the processor is configured to determine the power adjustment request to include the request to increase the level of the wireless power signal according to a positive subtraction result of the subtraction of the level of the wireless power signal from the reference level.

18. The apparatus of claim 15, wherein the power adjustment request is to indicate a requested adjustment size to adjust the wireless power signal.

19. The apparatus of claim 15, wherein the processor is configured to cause the non-contact power receiver device to operate at a power charge mode after transmission of the ID information, and to transmit the power adjustment request to the non-contact power transmission device at the power charge mode.

20. An apparatus of a non-contact power receiver device, the apparatus comprising:
control means for controlling an adjustment of a wireless power signal to be received at a secondary core of the non-contact power receiver device from a non-contact power transmission device, the control means comprising:
means for causing the non-contact power receiver device to transmit identification (ID) information to the non-contact power transmission device based on a received signal from the non-contact power transmission device, the ID information configured to identify the non-contact power receiver device;
means for determining a power adjustment request based on a comparison between a level of the wireless power signal from the non-contact power transmission device and a reference level, wherein the power adjustment request comprises a request to increase the level of the wireless power signal when the level of the wireless power signal is lower than the reference level, and wherein the power adjustment request comprises a request to decrease the level of the wireless power signal when the level of the wireless power signal is greater than the reference level; and
means for causing the non-contact power receiver device to transmit the power adjustment request to the non-contact power transmission device,
wherein the control means is configured to identify a level of an adjusted power signal received at the secondary core from the non-contact power transmission device based on the power adjustment request.

21. The apparatus of claim 20 comprising means for determining the power adjustment request according to a difference between the reference level and the level of the wireless power signal.

* * * * *